(12) United States Patent
Rees

(10) Patent No.: US 9,194,172 B2
(45) Date of Patent: Nov. 24, 2015

(54) SLIDING DOOR STRUCTURE HAVING SLIDING DOORS AND PIVOTING DOORS

(71) Applicant: Alan Rees, Oceanside, CA (US)

(72) Inventor: Alan Rees, Oceanside, CA (US)

( * ) Notice: Subject to any disclaimer, the term of this patent is extended or adjusted under 35 U.S.C. 154(b) by 0 days.

(21) Appl. No.: 14/462,515

(22) Filed: Aug. 18, 2014

(65) Prior Publication Data

US 2014/0352220 A1 Dec. 4, 2014

Related U.S. Application Data

(63) Continuation-in-part of application No. 12/916,716, filed on Oct. 26, 2010, now Pat. No. 8,806,807.

(51) Int. Cl.

| *E05D 15/20* | (2006.01) |
|---|---|
| *E06B 3/50* | (2006.01) |
| *E05D 15/06* | (2006.01) |
| *E05D 15/48* | (2006.01) |
| *E05D 15/56* | (2006.01) |
| *H04L 12/46* | (2006.01) |
| *H04N 1/00* | (2006.01) |
| *E05D 15/58* | (2006.01) |

(52) U.S. Cl.
CPC ............ *E06B 3/509* (2013.01); *E05D 15/0604* (2013.01); *E05D 15/0621* (2013.01); *E05D 15/48* (2013.01); *E05D 15/56* (2013.01); *H04L 12/4633* (2013.01); *H04N 1/00* (2013.01); *E05D 2015/586* (2013.01)

(58) Field of Classification Search
CPC ..... E06B 3/509; E05D 15/0604; E05D 15/48; E05D 15/56; E05D 15/0621; E05D 2015/586; H04L 12/4633
USPC ........... 49/125, 127, 128, 129, 130, 226, 234, 49/235, 409, 410, 411, 425, 254, 257, 258, 49/260
See application file for complete search history.

(56) References Cited

U.S. PATENT DOCUMENTS

| 3,266,189 | A | * | 8/1966 | Eby | 49/152 |
|---|---|---|---|---|---|
| 3,303,612 | A | * | 2/1967 | Baker | 49/127 |
| 4,438,594 | A | * | 3/1984 | Bunzl | 49/177 |
| 4,575,966 | A | * | 3/1986 | Gerritsen | 49/209 |
| 5,272,839 | A | * | 12/1993 | Karhu | 49/409 |
| 8,806,807 | B2 | * | 8/2014 | Rees | 49/257 |
| 2005/0284024 | A1 | * | 12/2005 | Bjorkman et al. | 49/176 |

* cited by examiner

*Primary Examiner* — Jerry Redman
(74) *Attorney, Agent, or Firm* — John R. Ross; John R. Ross, III

(57) ABSTRACT

A sliding panel structure. The sliding panel structure includes a frame having an upper support track and a lower guide rail. At least one sliding panel is connected between the upper support track and the lower guide rail. The sliding panel includes a sliding panel pivot axis and an extension for riding in the lower guide rail. The extension prevents undesired pivoting of the sliding panel about the sliding panel pivot axis. A mutual attraction device is connected between the sliding panel and the frame with a first mutual attraction part connected to the frame and the second mutual attraction part connected to the sliding panel. A fulcrum is utilized for tilting the sliding panel whenever the first mutual attraction part engages the second mutual attraction part.

9 Claims, 35 Drawing Sheets

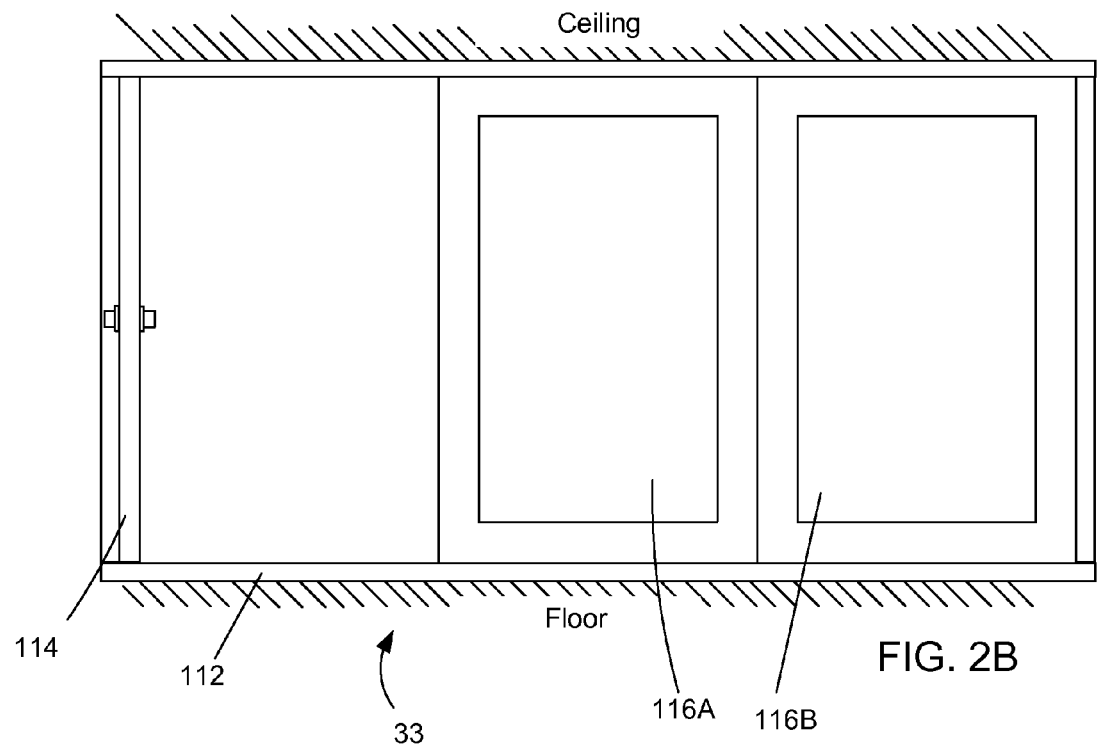
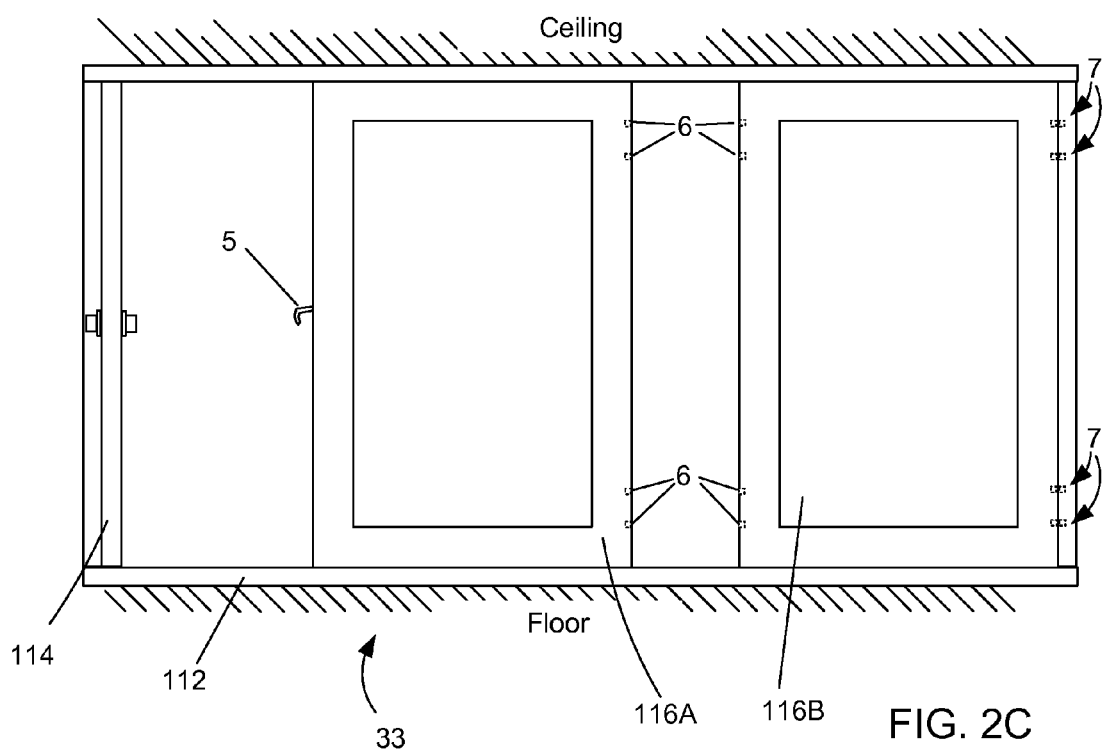

SLIDING DOOR STRUCTURE HAVING SLIDING DOORS AND PIVOTING DOORS

The present invention relates to door panel structures, and in particular, to door panel structures having sliding doors and pivoting doors. This application is a Continuation-in-Part (CIP) of U.S. application Ser. No. 12/912,716, filed Oct. 26, 2010 and issued as U.S. Pat. No. 8,806,807 on Aug. 19, 2014, which is incorporated by reference herein.

BACKGROUND OF THE INVENTION

Various types of track-suspended door structures are known. For example, U.S. Pat. No. 3,266,189 shows a typical power-operated arrangement. It is known to so arrange sliding doors that the doors can move not only in direction of a suspension track, for example in a straight line to and from each other, but additionally include panel members which are arranged for swinging movement transverse to the direction of sliding movement. Such additional swinging movement is desirable particularly in installations where a maximum panel opening is desired, for example to permit a large number of people to rapidly leave a building, or to provide an opening of increased width for vehicular traffic. Residential applications whereby the user desires maximum view and ventilation are also to be appreciated. However, sliding doors which are so arranged cause difficulties since swinging movement of the door panels or door elements of sliding doors does not permit attaching of hinges about which the doors can swing to a fixed frame. The attachment point for the hinges are movable and for swinging movement the doors can no longer be supported along their width from the top. For example, the hinge attachment on a sliding frame portion will shift, causing the door, as it swings, to bind against a floor structure. It is customary to provide sliding doors with a downwardly projecting guide element, typically a bolt, or the like, which slides in a guide track or rail. This bolt, however, is movable longitudinally in a sliding direction and will shift its position upon release of a swinging door element from the sliding door structure, so that it is suspended only on the hinges, due to the force moment which the door exerts on the hinge structure. It is undesirable to foreshorten the door so that the tilting of the door frame, upon swinging movement of the door, is compensated, since, then, when the door is closed, a gap will permit exchange of heated or cooled air, and otherwise interfere with the purposes of a door, which is to close off an opening.

U.S. Pat. No. 4,438,594 uses a massive metal angle element to provide a pre-stressing force and keep the door panel from binding with the floor structure ort to counteract the weight as the panels swing open. This type of counterweight would add considerably to the weight of the door and require more strength to push the panel open or closed. Massive counterweights require reinforcements in the building frame and door jamb to hold the additional weight. A massive counterweight would require heavy duty bogies, guide tracks, and pivot hinges to carry the weight. Shipping would also be more expensive due to the additional weight. Installation of the door panels would require more manpower to hold up the "massive counterweight" while installers secure the panels to the bogies. The added shipping weight, manufacturing cost and labor would be cost prohibitive.

U.S. Pat. No. 5,272,839 uses a toothed apparatus and hinge pins to eliminate friction and weight transfer. The '839 patent also suggests a wing shaped bracket to prevent the pane from tilting. Brackets springs, and toothed apparatus require precision manufacturing and highly trained installers because the panels would need to be aligned perfectly. Toothed apparatuses and wing shaped brackets can wear out easily with repeated use. These disadvantages would add to the cost of manufacturing and installation as well as allowing for more points of failure in the closure.

Bi-folds closure, which are known and have been around since the 1950's. The Nana bi-fold doors manufactured by NanaWall Systems, Inc. or the lanai bi-fold doors, manufactured by Lanai Doors Incorporated, require four to eight hinge mechanisms per panel to stabilize and transfer the weight of the attached open panels to the frame of the building. These many hinges keep the panels from binding against a floor structure. These hinge mechanisms require precise manufacturing and installation because many of the panels are attached together like a train and a failure at one hinge or wheeled carriage bogie effects all the attached panels rendering the door inoperable. With many parts that need to be manufactured and assembled precisely and difficult installation, the costs for these bi-fold closure systems tend to be in the high end or Luxury category. More hinges also create more failure points for these bi-fold closures. Bi-fold closures are limited in their width due to the fact that the more panels that are attached together, the heavier the closure becomes and the harder it is for the consumer to push open a multi panel bi-fold closure because they need to move all the attached weight.

What is needed is a better sliding door structure.

SUMMARY OF THE INVENTION

The present invention provides a sliding panel structure. The sliding panel structure includes a frame having an upper support track and a lower guide rail. At least one sliding panel is connected between the upper support track and the lower guide rail. The sliding panel includes a sliding panel pivot axis and an extension for riding in the lower guide rail. The extension prevents undesired pivoting of the sliding panel about the sliding panel pivot axis. A mutual attraction device is connected between the sliding panel and the frame with a first mutual attraction part connected to the frame and the second mutual attraction part connected to the sliding panel. A fulcrum is utilized for tilting the sliding panel whenever the first mutual attraction part engages the second mutual attraction part.

BRIEF DESCRIPTION OF THE DRAWINGS

FIGS. 2A-2B show the stationary door opened.

FIGS. 2C-2G show the sliding door moving towards the stationary door.

DETAILED DESCRIPTION OF THE PREFERRED EMBODIMENTS

Figure 1:
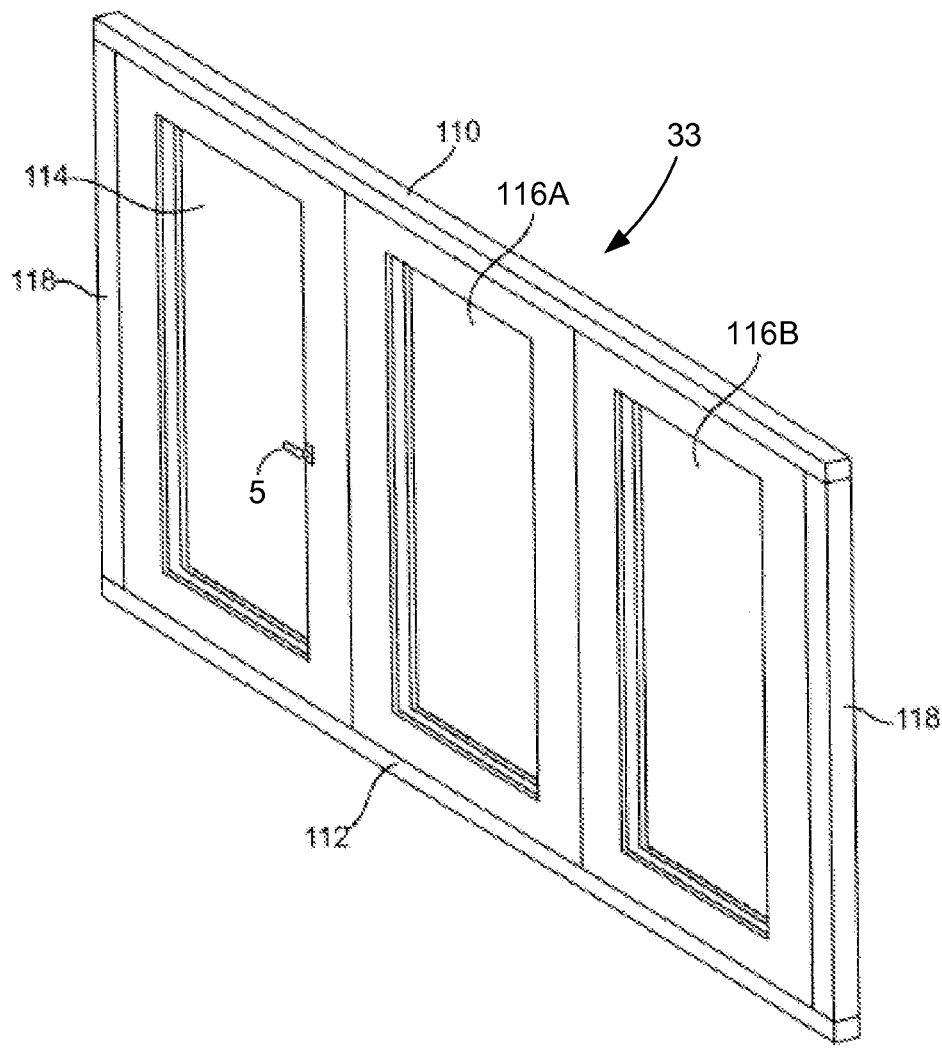
FIGS. 1-1D show a preferred embodiment of the present invention.
Figure 1A:
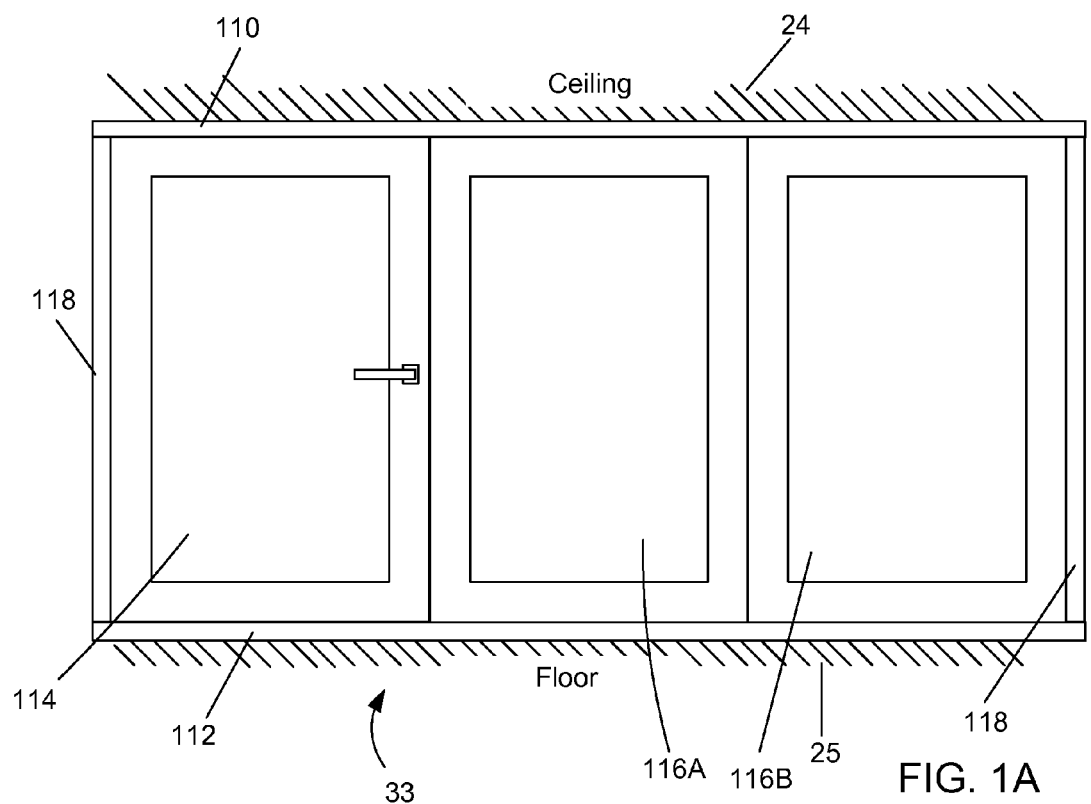

FIGS. 1 and 1A show a right prospective and front view of sliding door structure 33. Sliding door structure 33 is shown in the closed position and includes upper support track 110 and a lower guide rail 112. In a preferred embodiment both upper support track 110 and lower guide rail 112 are aluminum extrusions. Upper support track 110 is preferably fastened to ceiling 24 and a lower guide rail 112 is preferably attached to floor 25. Door jambs 118 are located as shown on both sides of sliding door structure 33. Sliding door structure 33 preferably includes one stationary door 114 and two sliding doors 116A and 116B. The frames of doors 114, 116B and 116A are preferably constructed of aluminum extrusions. Also, preferably, panels 114 and 116 include an insulated glazing unit (not shown).

Figure 1B:
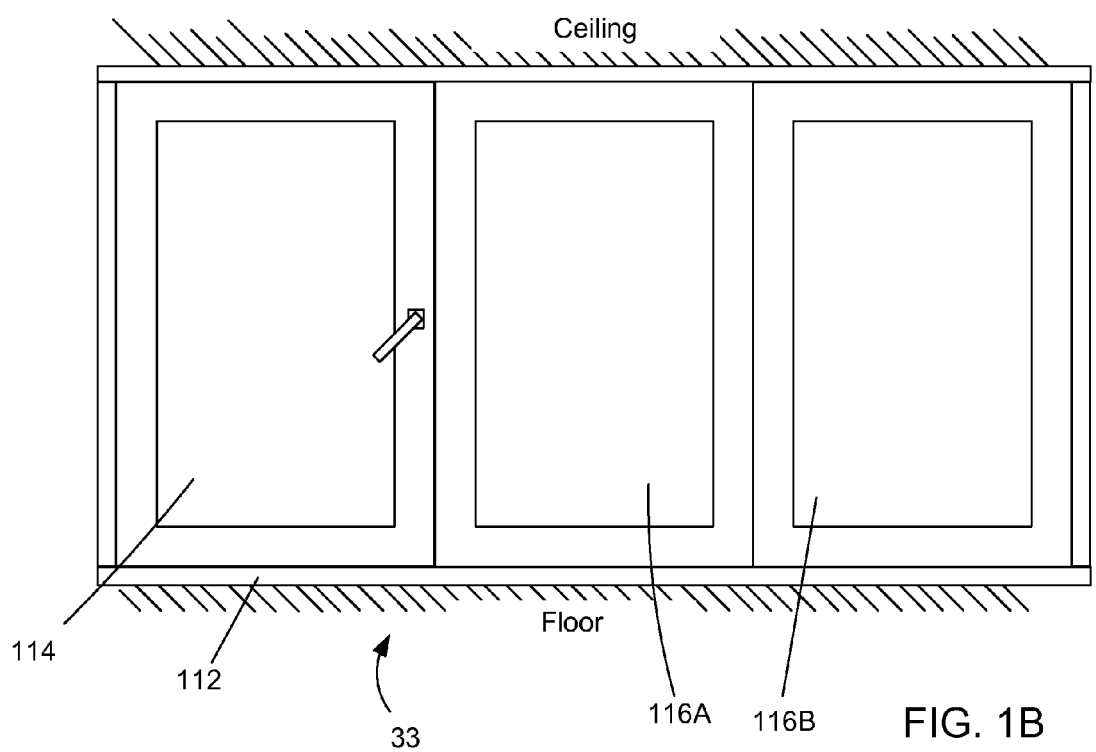
Figure 1C:
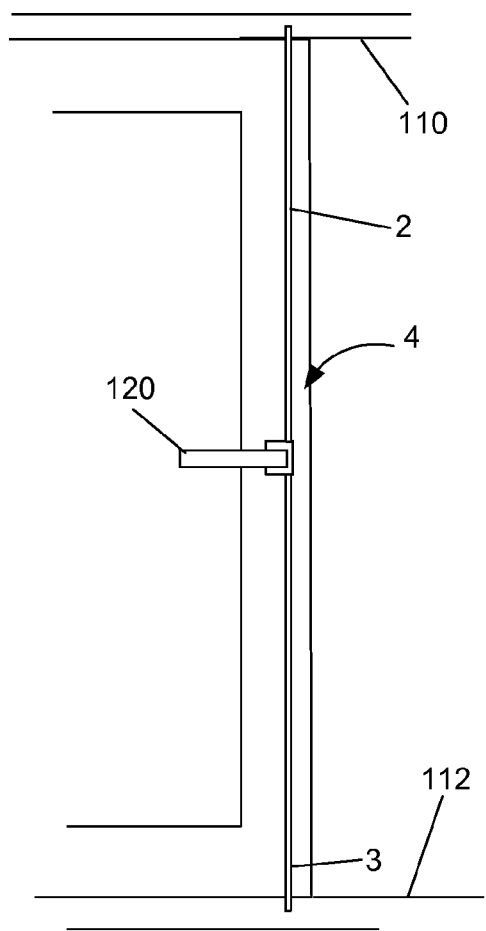
Figure 1D:
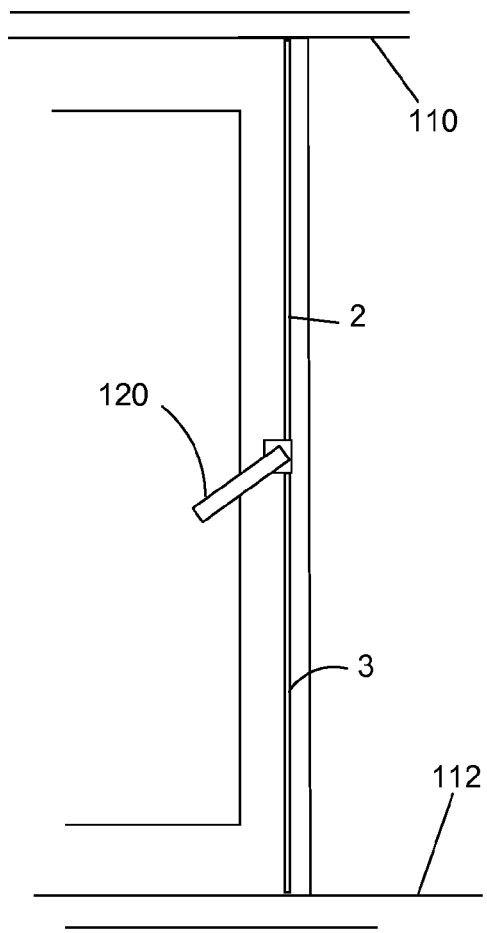

Sliding door structure 33 preferably utilizes dual point shoot bolt locking hardware 4 (FIG. 1C). Stationary door 114 is secured in the position shown in FIGS. 1 and 1A by the extension of shoot bolt 2 into upper support track 110 and the extension of shoot bolt 3 into lower guide rail 112 (FIG. 1C). As the user turns handle 120 forty-five degrees (FIGS. 1B and 1D), shoot bolts 2 and 3 are retracted. This disengages door 114 from upper support track 110 and lower guide rail 112 so that the door can be easily opened.

Figure 2A:
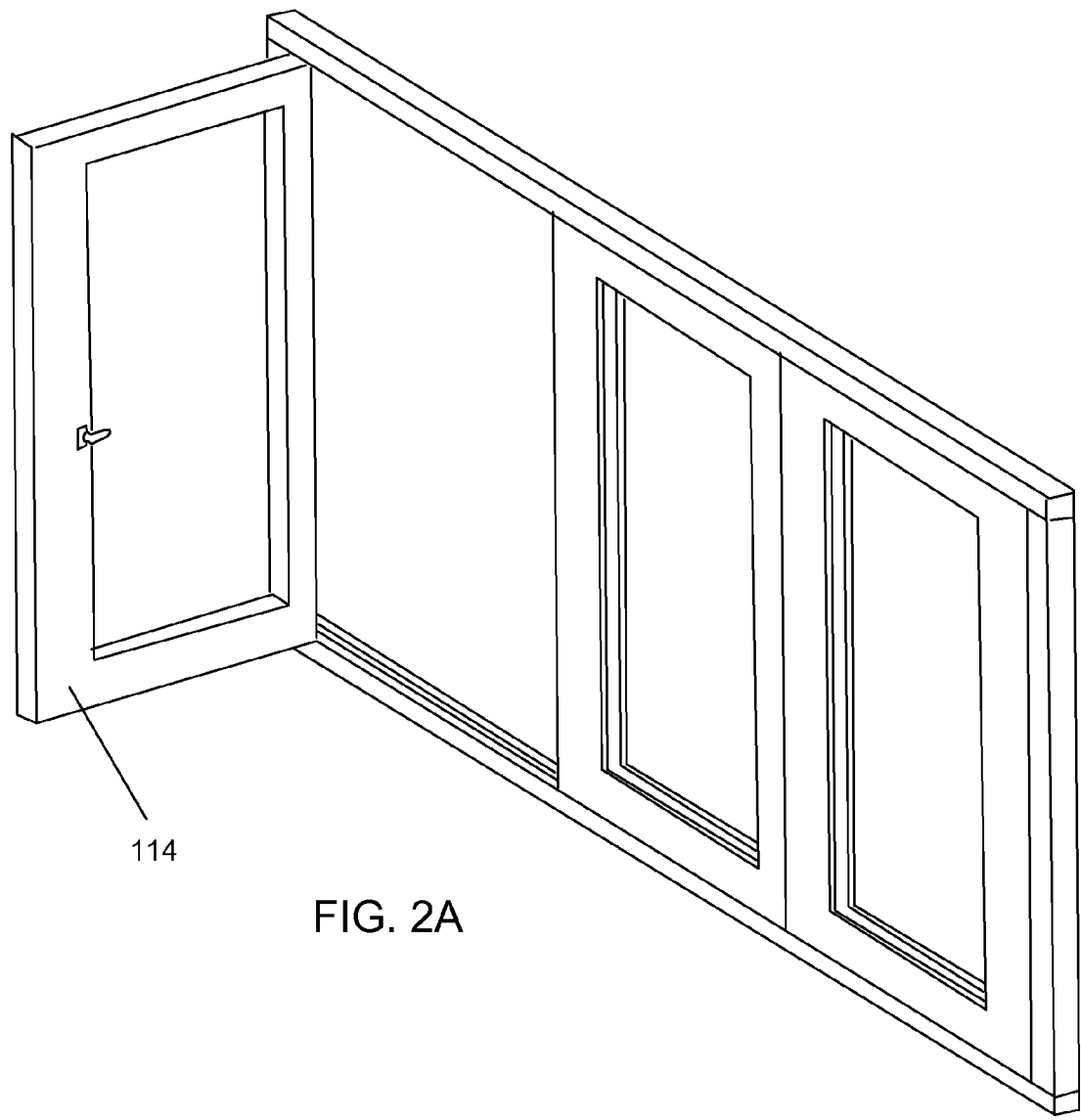

As shown in FIGS. 2A and 2B the user has pulled stationary door 114 so that it has pivoted 90 degrees and is opened. In FIG. 2C the user has grabbed retractable handle 5 and has pulled sliding door 116A to the left with sufficient force to overcome the magnetic attraction of door magnets 6. In a preferred embodiment, the magnetic attraction force between magnets 7 is greater than the magnetic attraction force between magnets 6. Therefore, as the user pulls handle 5, door 116A moves leftward but door 116B remains in place.

Figure 2D:
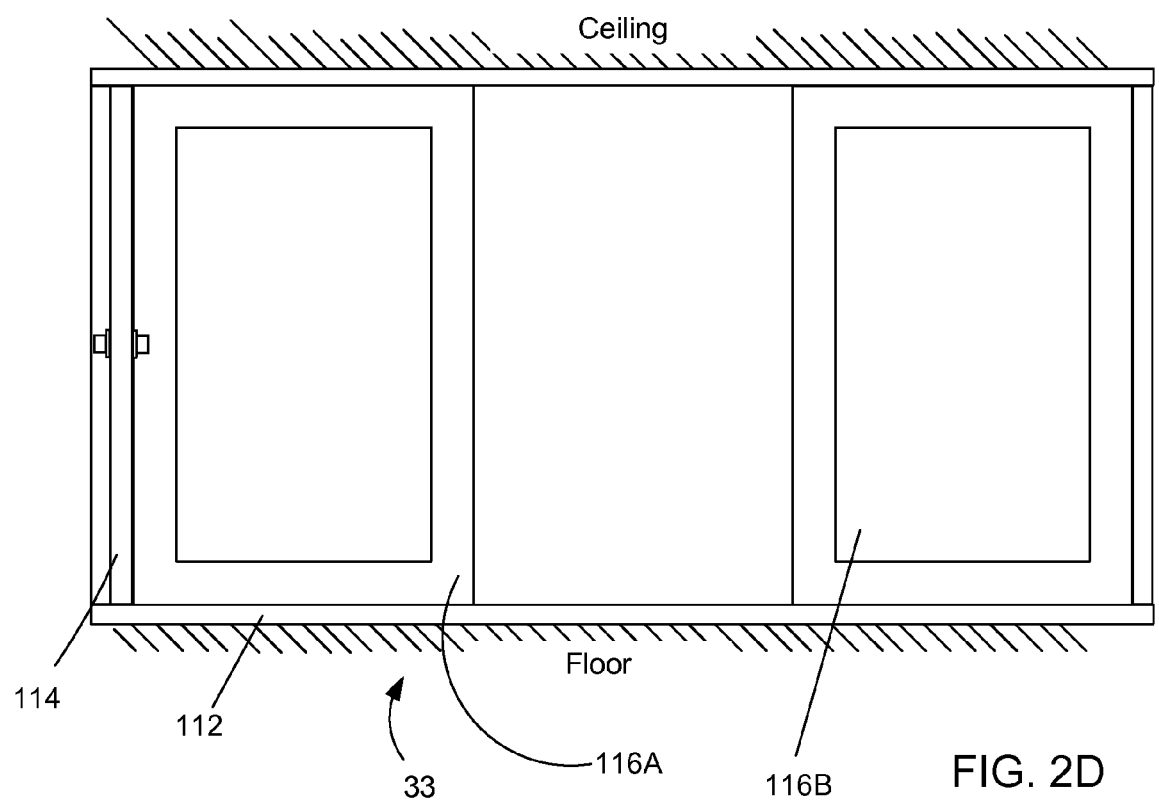
Figure 2E:
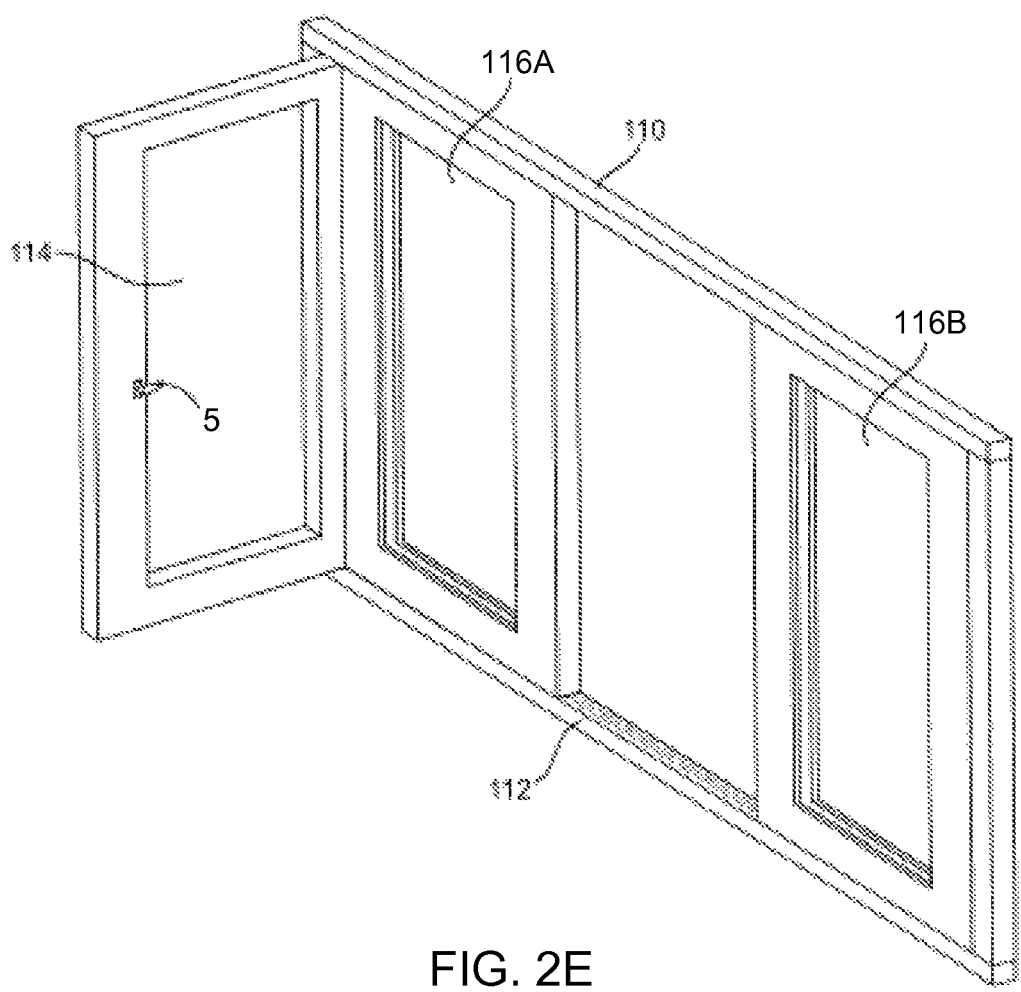
Figure 2F:
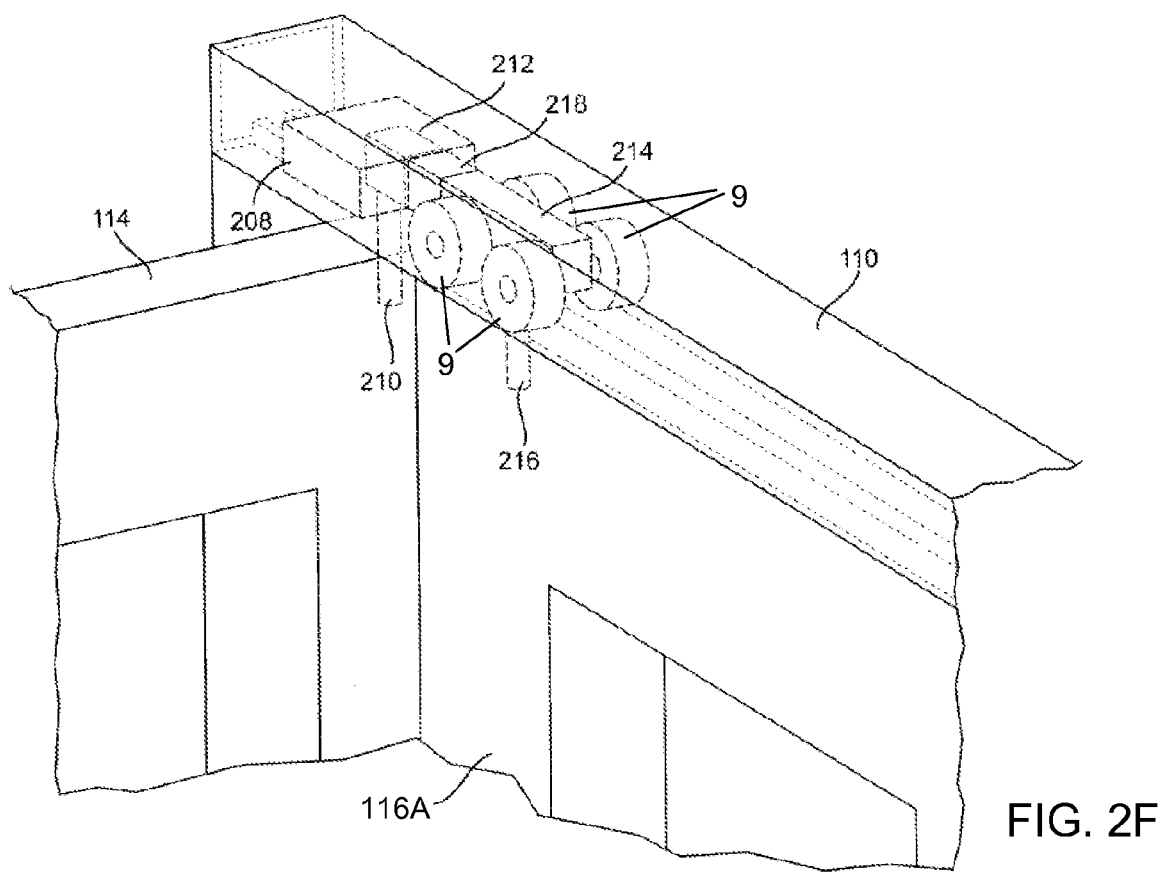

As shown in FIGS. 2D, 2E and 2F the user has pulled sliding door 116A all the way leftward. FIG. 2F shows a close up perspective view of the tops of stationary door 114, sliding door 116A and upper support track 110.

As shown in FIG. 2F, upper pivot hinge 210 extends downward from stationary upper anchor 208. Stationary door magnet 212 is housed inside stationary upper anchor 208. Likewise, upper pivot hinge 216 extends downward from upper bogie 214. Sliding door magnet 218 is attached to upper bogie 214. Upper bogie 214 is supported by wheels 9. Wheels 9 are configured to roll inside upper support track 110, thereby allowing sliding door 116A to slide leftward and rightward.

As shown in FIG. 2F stationary door 114 is pivoted 90 degrees open and sliding door 116A has been slid toward stationary door 114 so as to engage stationary door magnet 212 with sliding door magnet 218. Preferably magnets of an industrial strength and quality are utilized.

FIG. 2F shows upper support track 110 having the approximate shape of an upside down "u" with flanges pointing inward toward the center and a grove running down the middle so that bogie 214 can run horizontally within upper support track 110. Stationary door 114 is attached to stationary upper anchor 208 via fixed pivot hinge 210. Preferably, stationary upper anchor 208 is fabricated from aluminum.

Figure 2G:
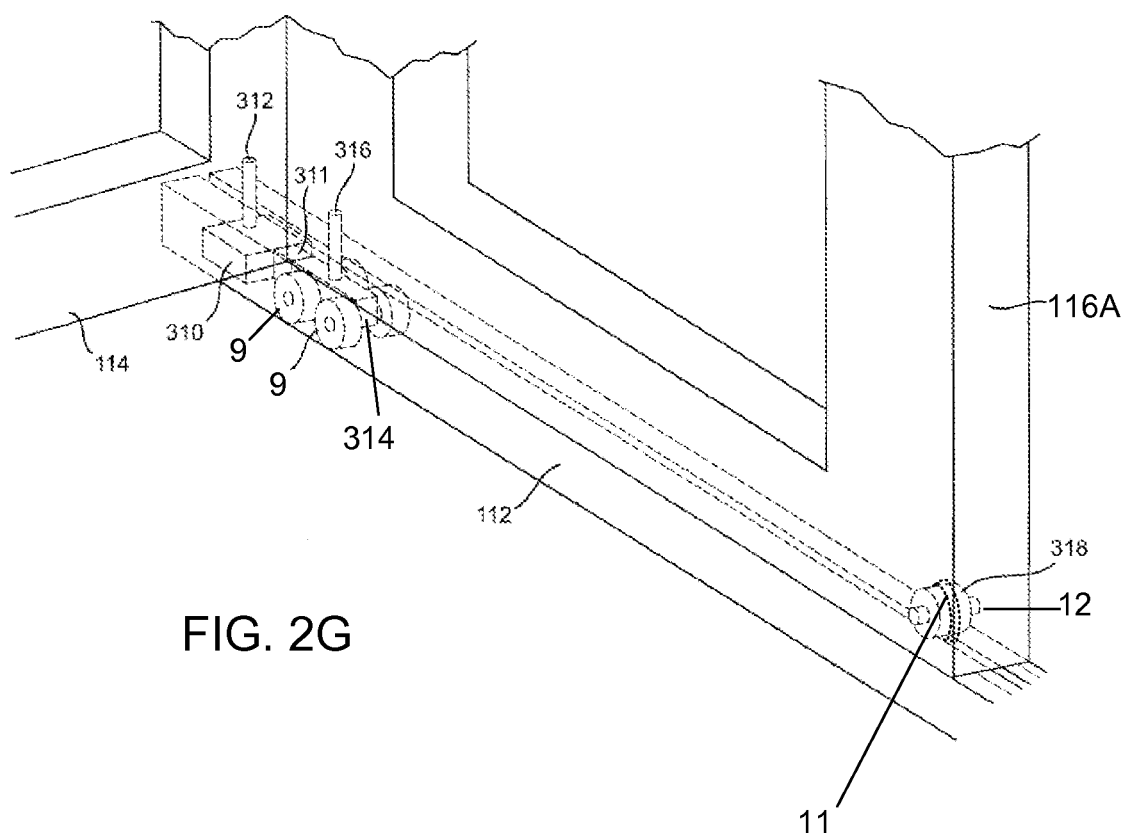

FIG. 2G shows a close up perspective view of the bottom of stationary door 114, sliding door 116A and lower guide rail 112. As shown in FIG. 2G, lower pivot hinge 312 extends upward from bottom stationary anchor 310. Likewise, lower pivot hinge 316 extends upward from lower bogie 314. Lower bogie 314 is supported by wheels 9. Wheels 9 are configured to roll inside lower guide rail 112, thereby allowing sliding door 116A to slide leftward and rightward.

Lower guide rail 112 has a cross section that is fabricated in the general shape of a "u" with flanges pointing inward toward the center and a grove running down the middle so lower pivot hinge 316 can run horizontally within the lower guide rail 112. Lower bogie 314 is constructed similar to upper bogie 214.

Roller 318 is attached to sliding door 116A via axis 12. Roller 318 includes center extension 11 that fits into groove 13 of lower guide rail 112. Roller 318 is wider than the groove 13 and rides on the top of lower guide rail 112. Preferably, roller 318 is made from a heavy duty convex nylon. Roller 318 is attached to sliding door 116A in such a way as to enable sliding door 116A to be slid horizontally left or right while keeping sliding door 116A square in the closure. Center extension 11 holds sliding door 116A parallel to upper support track 110 and lower guide rail 112 while sliding door 116A is being slid leftward or rightward.

Fulcrum

Figure 2H:
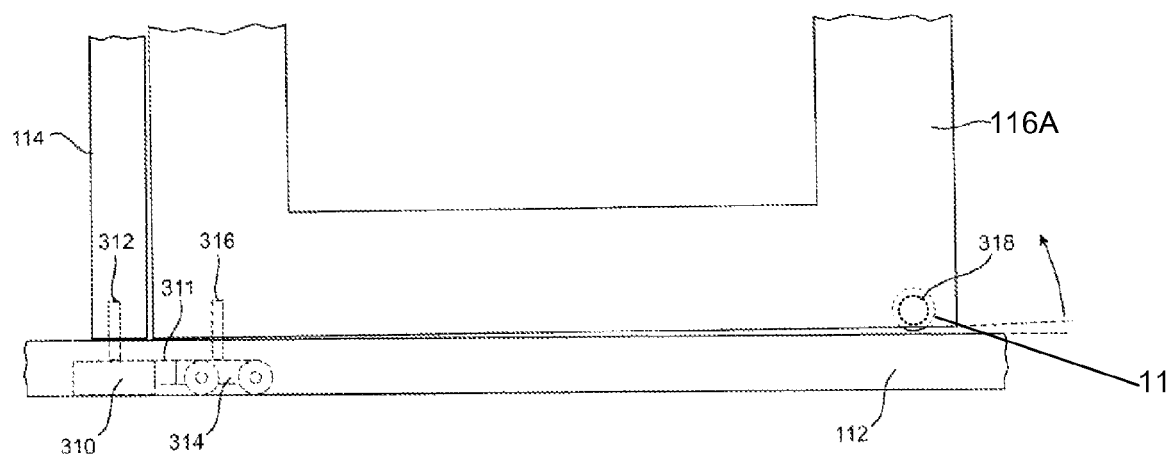
FIG. 2H shows the operation of the fulcrum.

As shown in FIGS. 2G and 2H, fulcrum 311 is rigidly connected to stationary bottom anchor 310 so as to stop lower bogie 314 just before stationary door magnet 212 and sliding door magnet 218 are drawn together via magnetic force. Fulcrum 311 is installed in such a way as to work in unison with stationary door magnet 212 and sliding door magnet 218 and lower bogie 314 to tilt sliding door 116A so as to lift center extension 11 clear of groove 13 of lower guide track 112 (see also FIG. 2H).

Figure 3A:
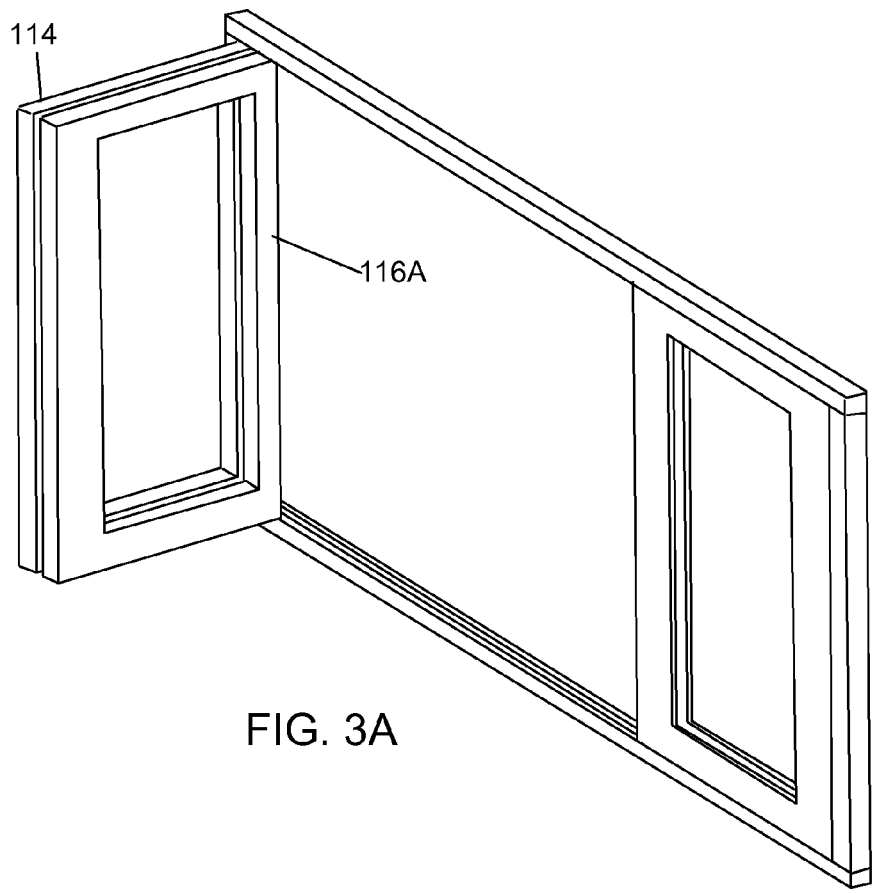
FIGS. 3A-3B show the first sliding door opened.
Figure 3B:
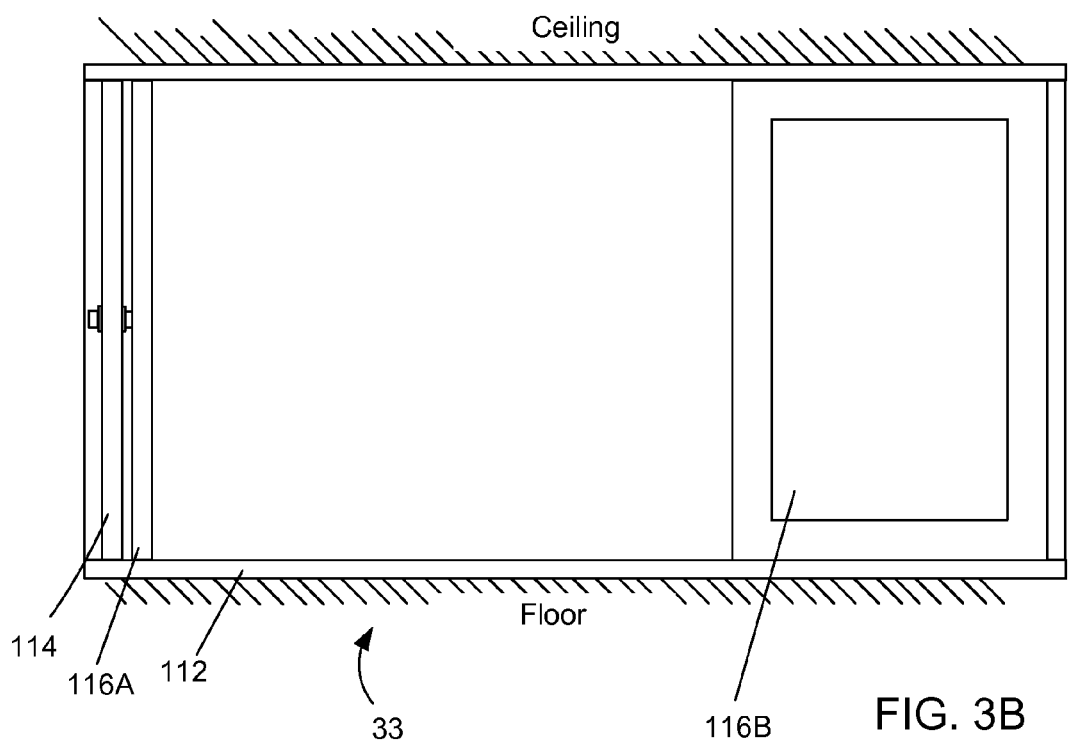

As shown in FIGS. 3A and 3B, because extension 11 is clear of groove 13 (FIG. 2H), the user is able to pull on sliding door 116A causing it to pivot about the axis formed by upper pivot hinge 216 (FIG. 2F) and lower pivot hinge 316 (FIG. 2G).

Figure 3C:
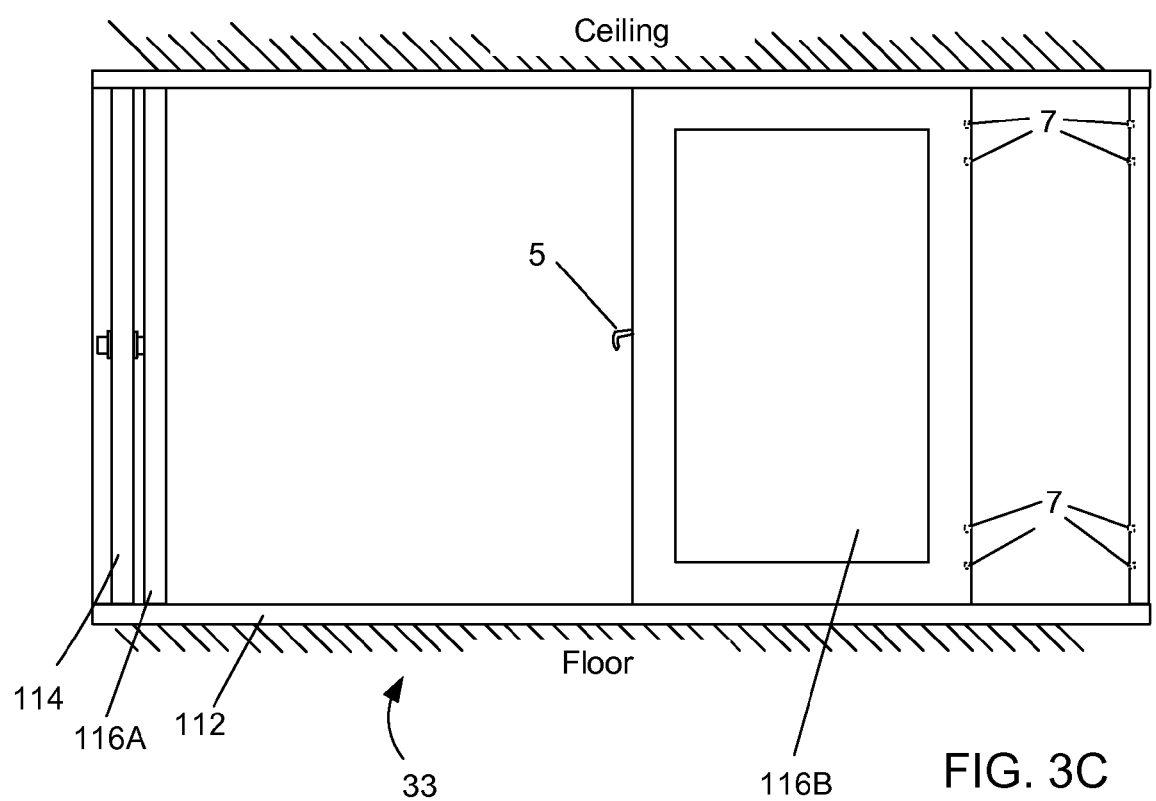
FIGS. 3C-3E show the second sliding door moving towards the first sliding door.

In FIG. 3C the user has grabbed retractable handle 5 of sliding door 116B overcoming the magnetic attractive force of magnets 7.

Figure 3D:
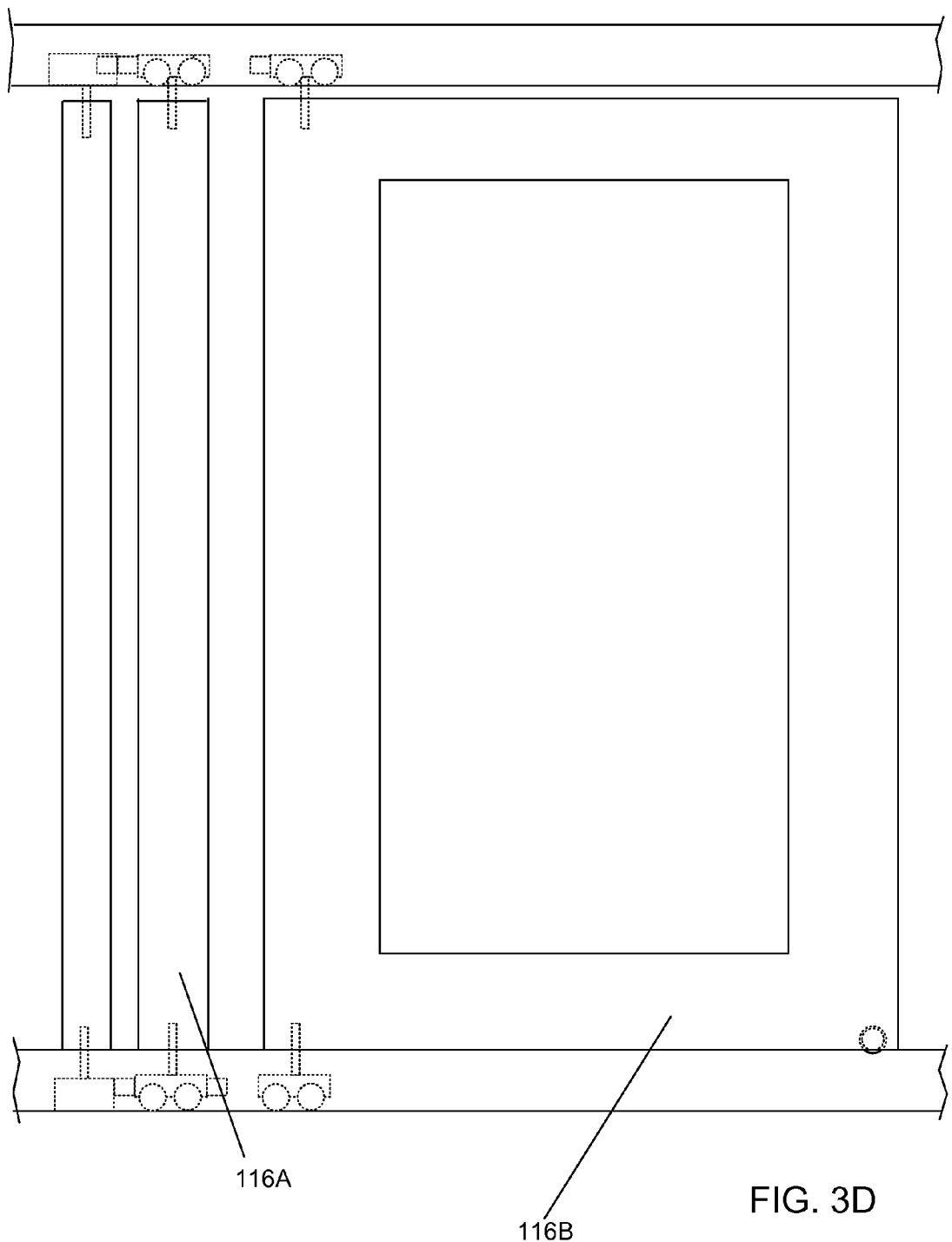

In FIG. 3D, the user has pulled sliding door 116B so that it is very close to opened sliding door 116A. Extension 11 is inside groove 13 (FIG. 2G) of lower guide track 112.

Figure 3E:
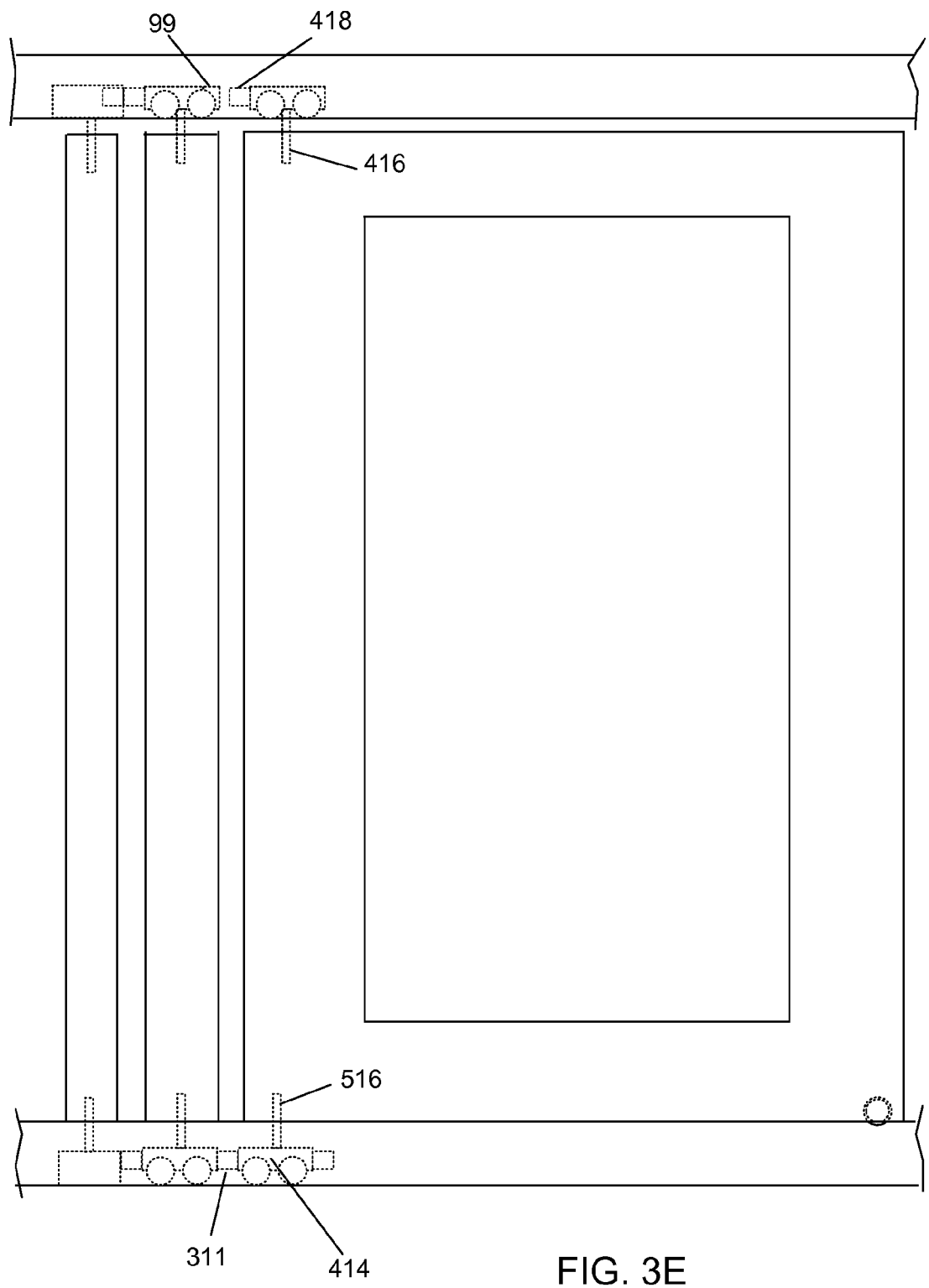

In FIG. 3E, lower bogie 414 has made contact with fulcrum 311. Inside upper support track 110 magnet 418 has not made contact with magnet 99. However, the magnets are of sufficient strength and distance so that a magnetic force is drawing them together.

Figure 3F:
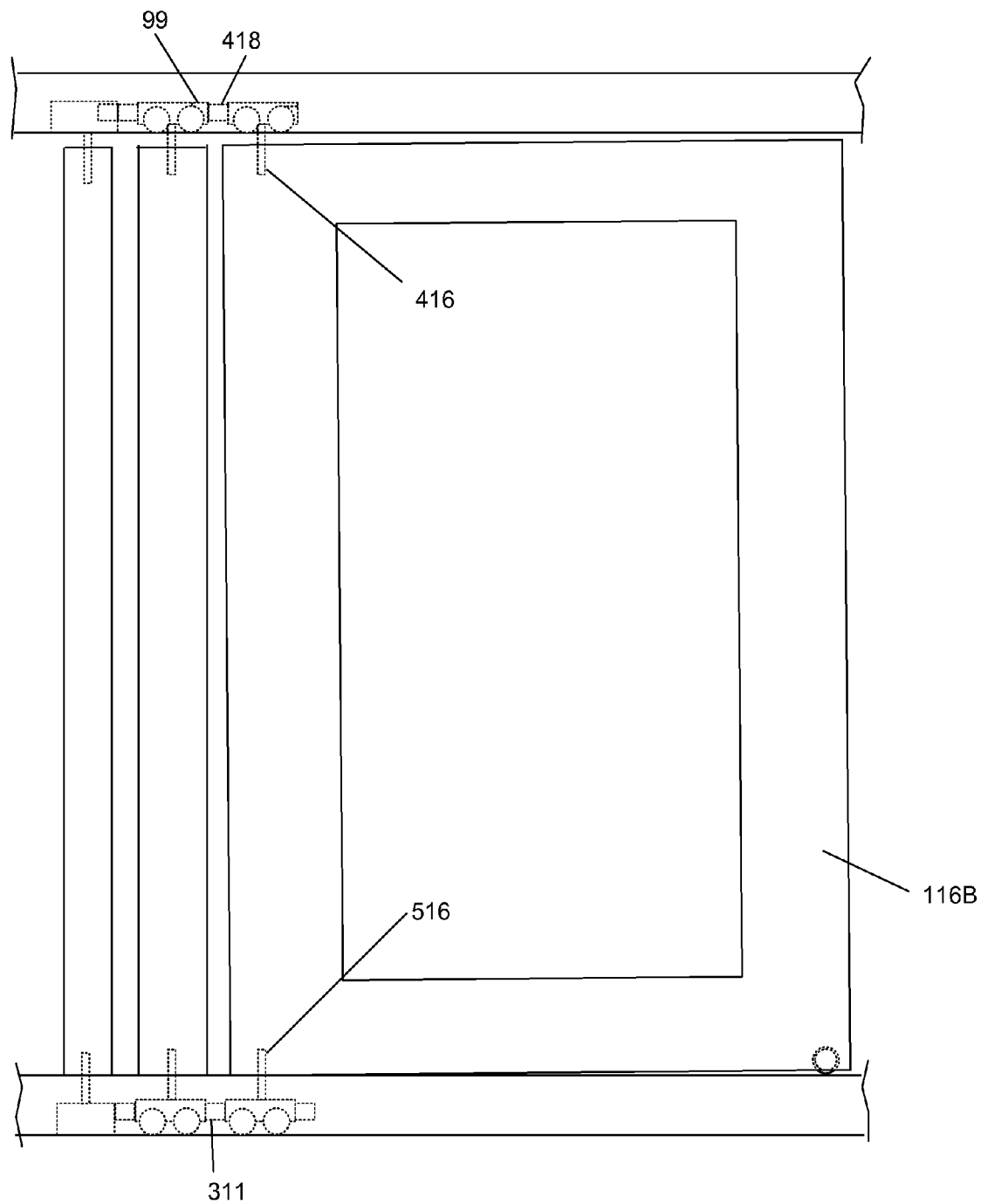
FIG. 3F shows the operation of the fulcrum on the second sliding door.
Figure 3G:
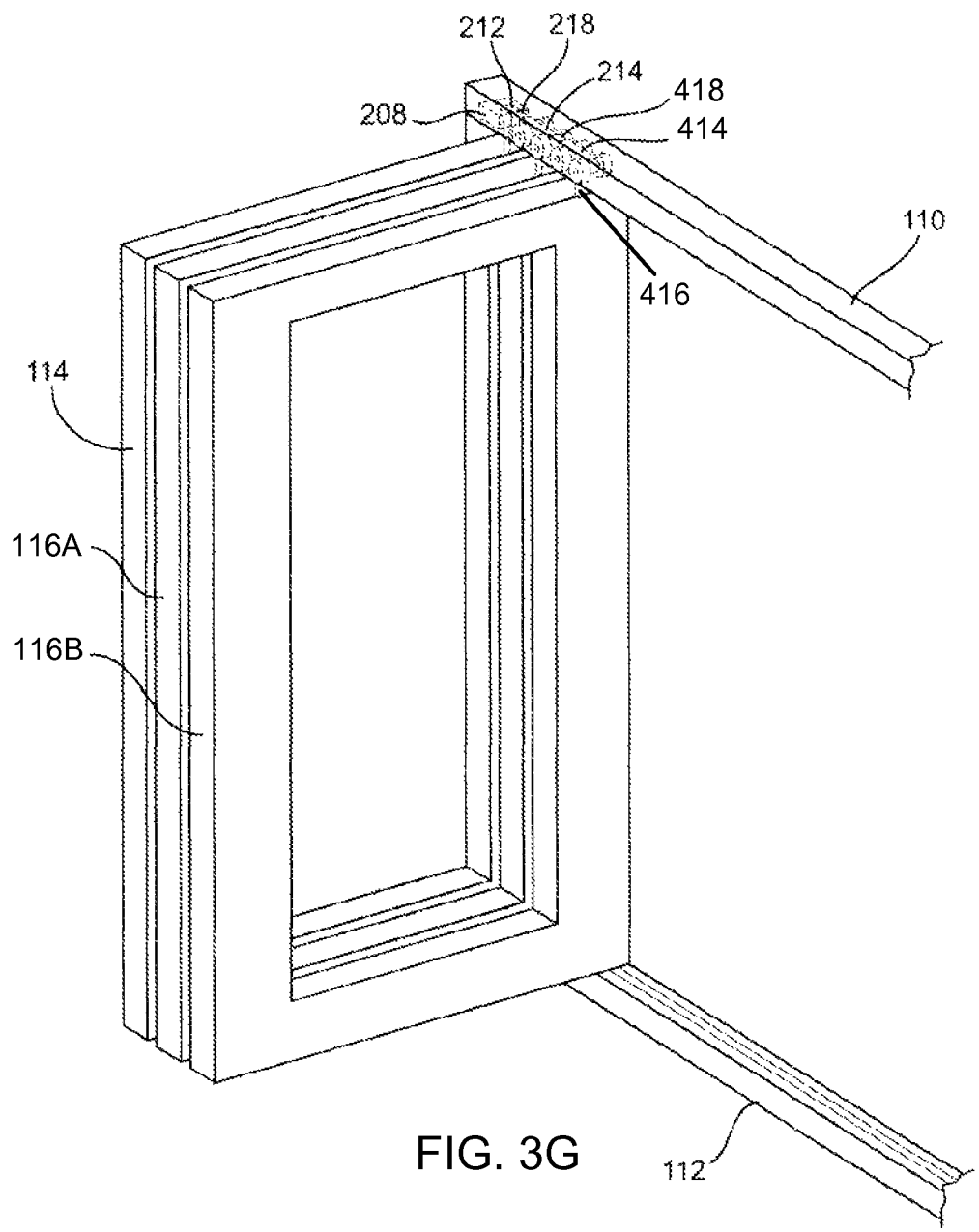
FIGS. 3G-3H show the second sliding door opened.
Figure 3H:
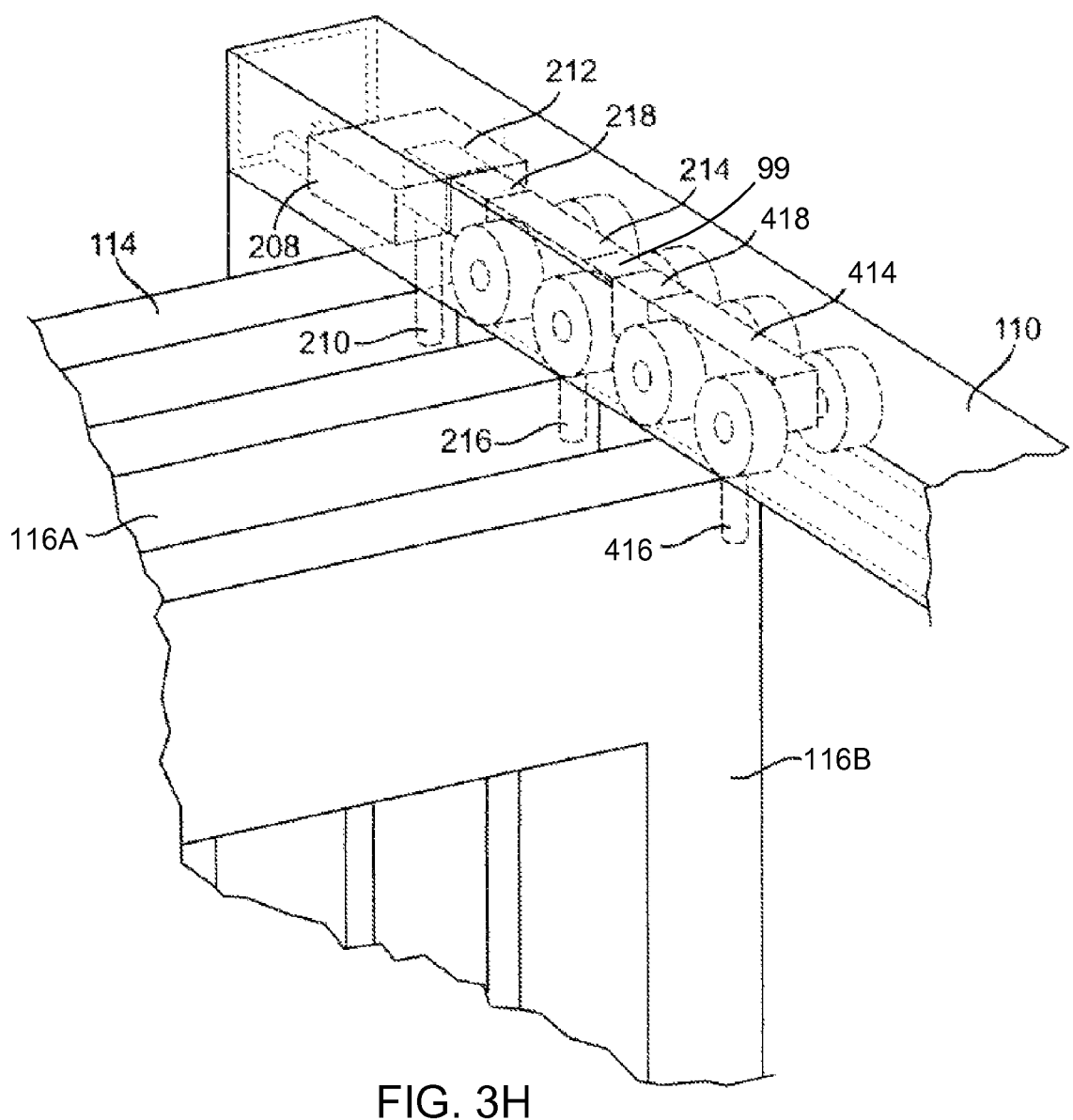

In FIG. 3F, magnetic force has drawn magnet 418 and magnet 99 together. Fulcrum 311 has caused sliding door 116B to pivot as shown so that extension 11 has cleared groove 13 (FIG. 2G) of lower track guide 112. Now the user may easily open sliding door 116B so that it can pivot about the axis formed by upper pivot hinge 416 and lower pivot hinge 516, as shown in FIGS. 3G and 3H.

Other Preferred Embodiments

Multiple Sliding Doors

Figure 4:
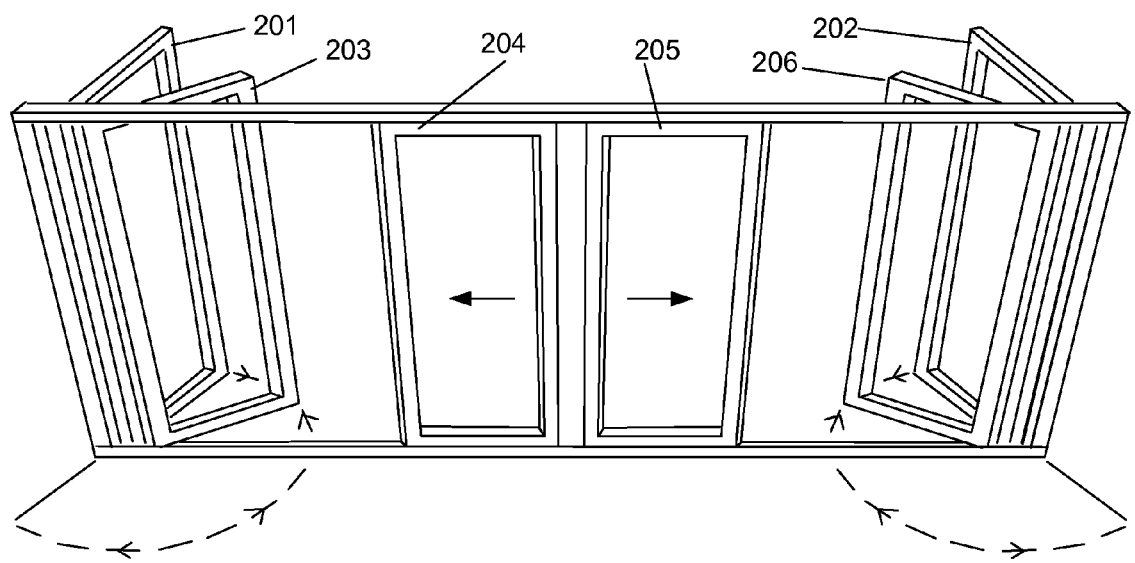
FIG. 4 shows another preferred embodiment of the present invention.

The above described preferred embodiment showed a preferred embodiment having one stationary door 114 and two sliding doors 116A and 116B. It is possible to modify the present invention to include as many sliding doors as desired and to include another stationary door if desired. For example, FIG. 4 shows sliding door structure 34 having stationary doors 201 and 202. Sliding door structure 34 also has four sliding doors 203, 204, 205 and 206. Doors 203 and 204 are configured to slide to the left and doors 205 and 206 are configured to slide to the right.

Windows

Figure 5:
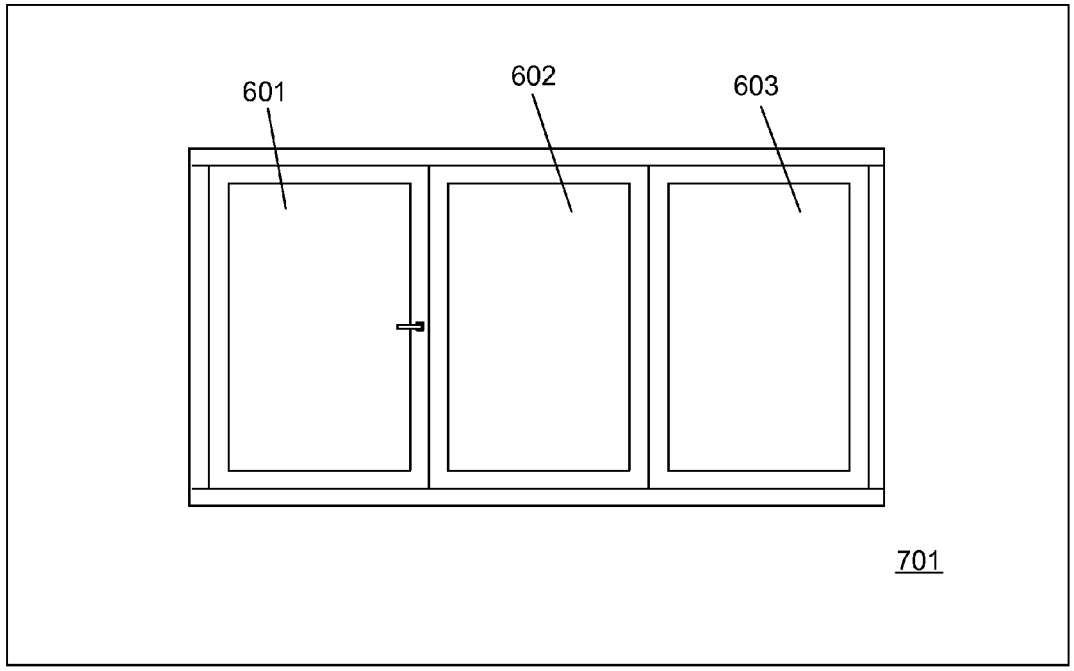
FIGS. 5-6 show another preferred embodiment of the present invention.

Although the above preferred embodiments described the present invention as being utilized for doors, it is also possible to utilize the present invention for other panel devices. For example, FIG. 5 shows the utilization of the present invention for windows. FIG. 5 shows stationary window 601 and sliding windows 602 and 603 mounted onto wall 701.

Figure 6:
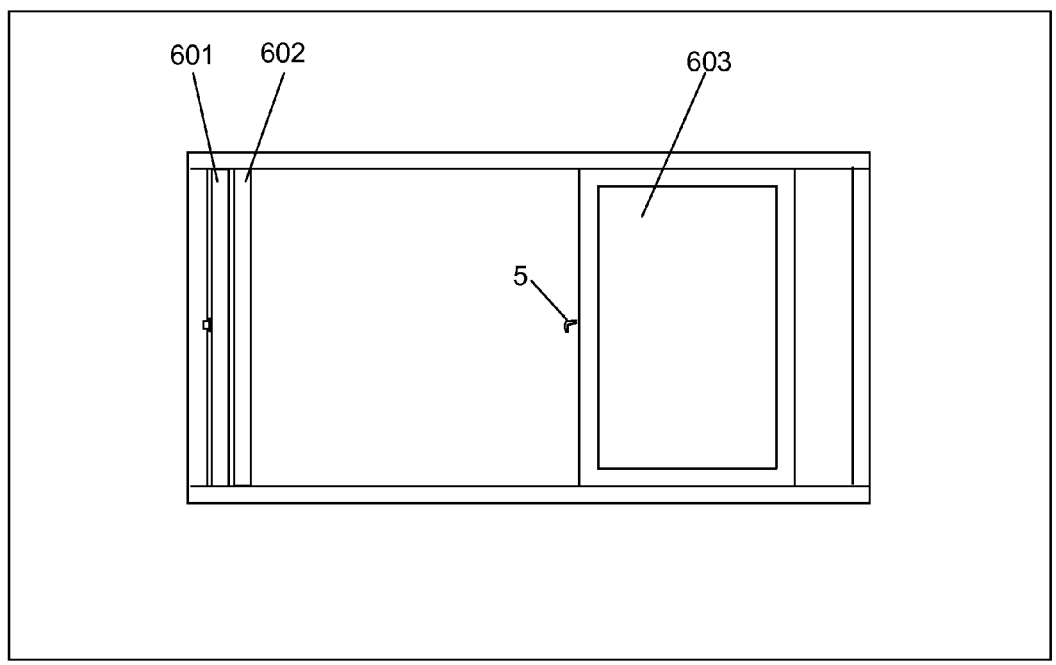

In FIG. 6, the user has opened stationary window 601 and sliding window 602 in a fashion similar to that described above. The user has grabbed retractable handle 5 and is pulling sliding window 603 leftward. If the user desires, he can also open sliding window 603 by utilization of a fulcrum in a fashion similar to that described above.

Other Preferred Embodiment

Figure 7:
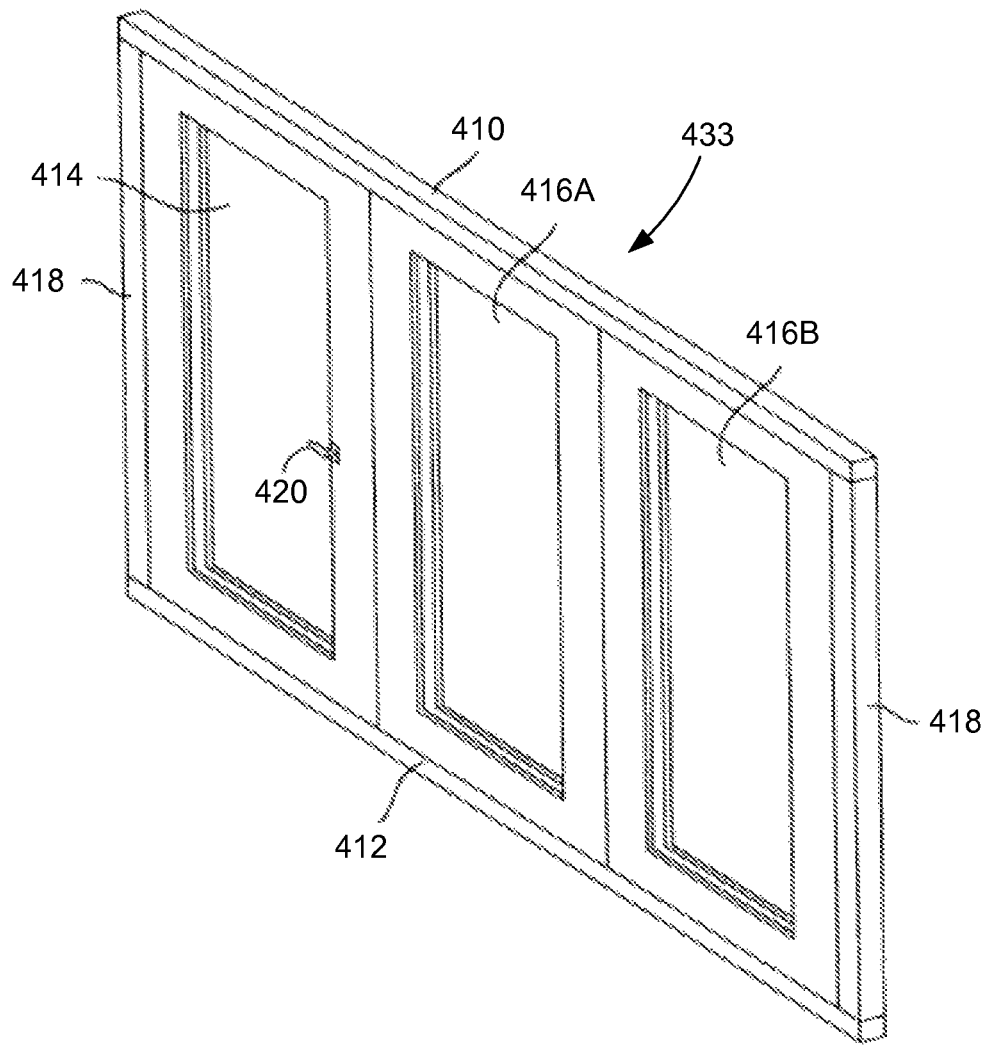
FIGS. 7-9H show another preferred embodiment of the present invention.
Figure 7A:
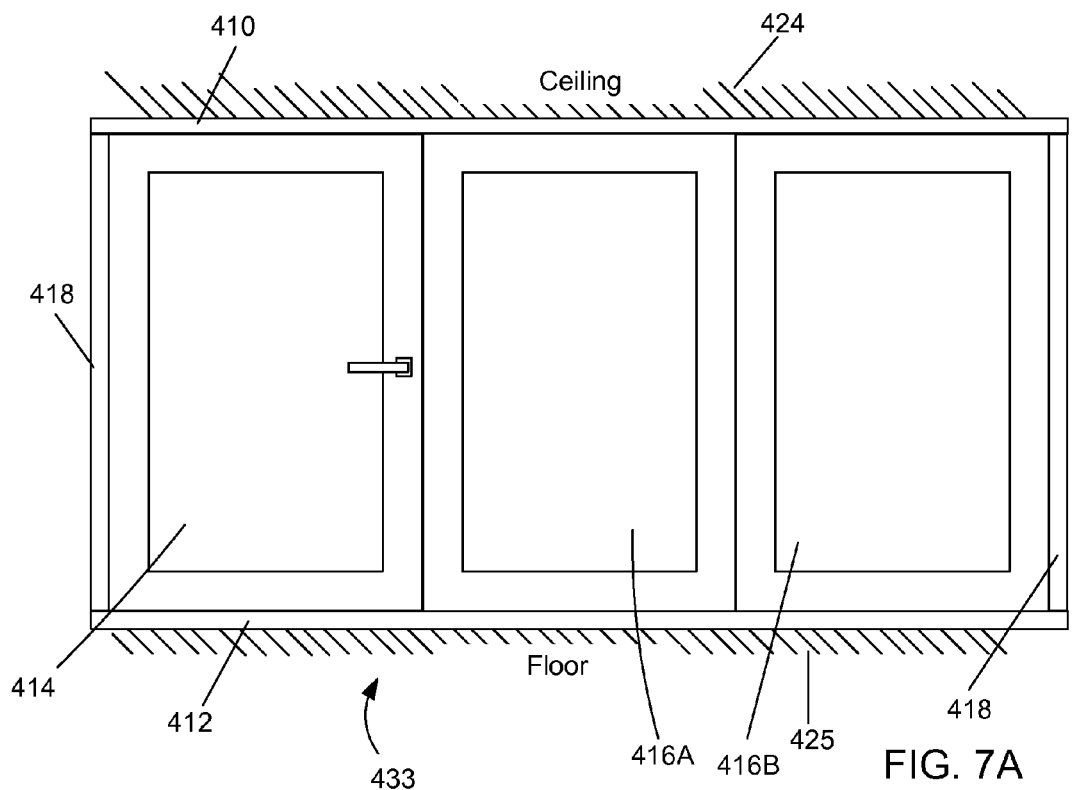
Figure 7B:
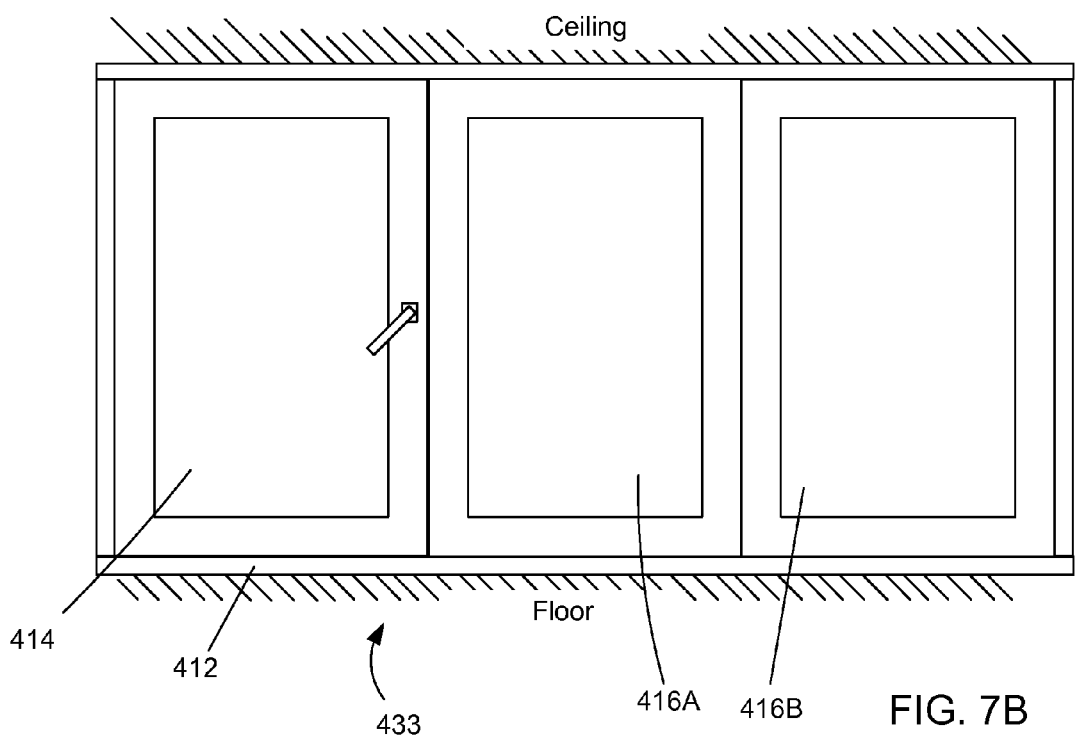

FIGS. 7 and 7A show a right prospective and front view of sliding door structure 433. Sliding door structure 433 is shown in the closed position and includes upper support track 410 and a lower guide rail 412. In a preferred embodiment both upper support track 410 and lower guide rail 412 are aluminum extrusions. Upper support track 410 is preferably fastened to ceiling 424 and a lower guide rail 412 is preferably attached to floor 425. Door jambs 418 are located as shown on both sides of sliding door structure 433. Sliding door structure 433 preferably includes one stationary door 414 and two sliding doors 416A and 416B. The frames of doors 414, 416B and 416A are preferably constructed of aluminum extrusions. Also, preferably, doors 414 and 416B and 416A include an insulated glazing unit (not shown).

Figure 7C:
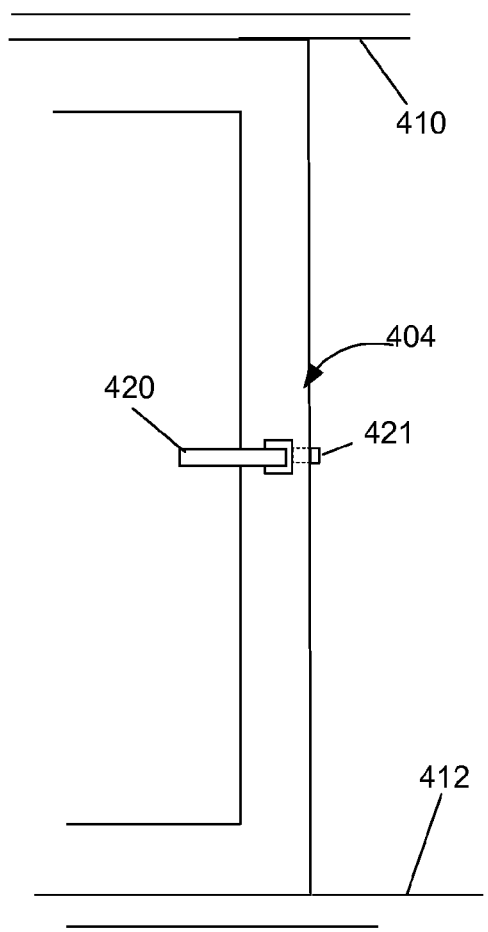
Figure 7D:
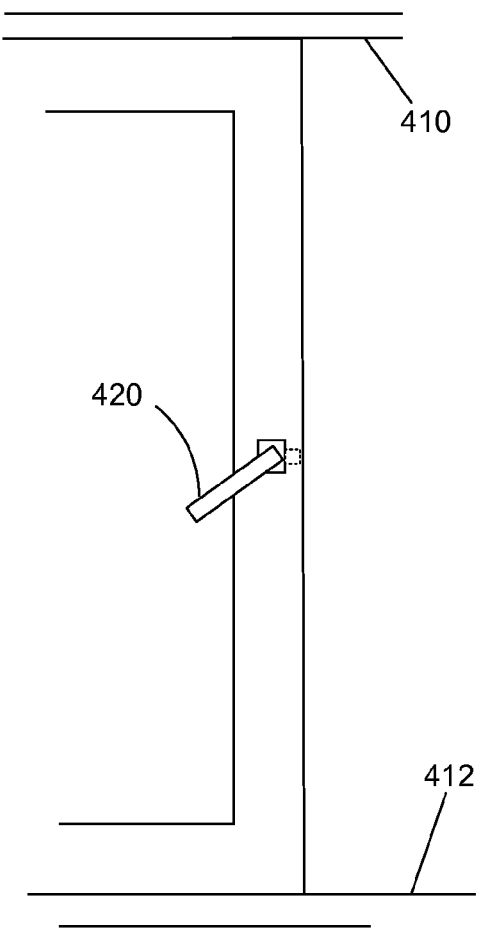

Sliding door structure 433 preferably utilizes looking door latch 404 (FIG. 7C). Stationary door 414 is secured in the position shown in FIGS. 7 and 7A by the extension of locking bolt 421 into door 416A. As the user turns handle 420 forty-five degrees (FIGS. 7C and 7D), locking bolt 421 is retracted. This disengages door 414 from door 416A so that door 414 can be easily opened.

Figure 8A:
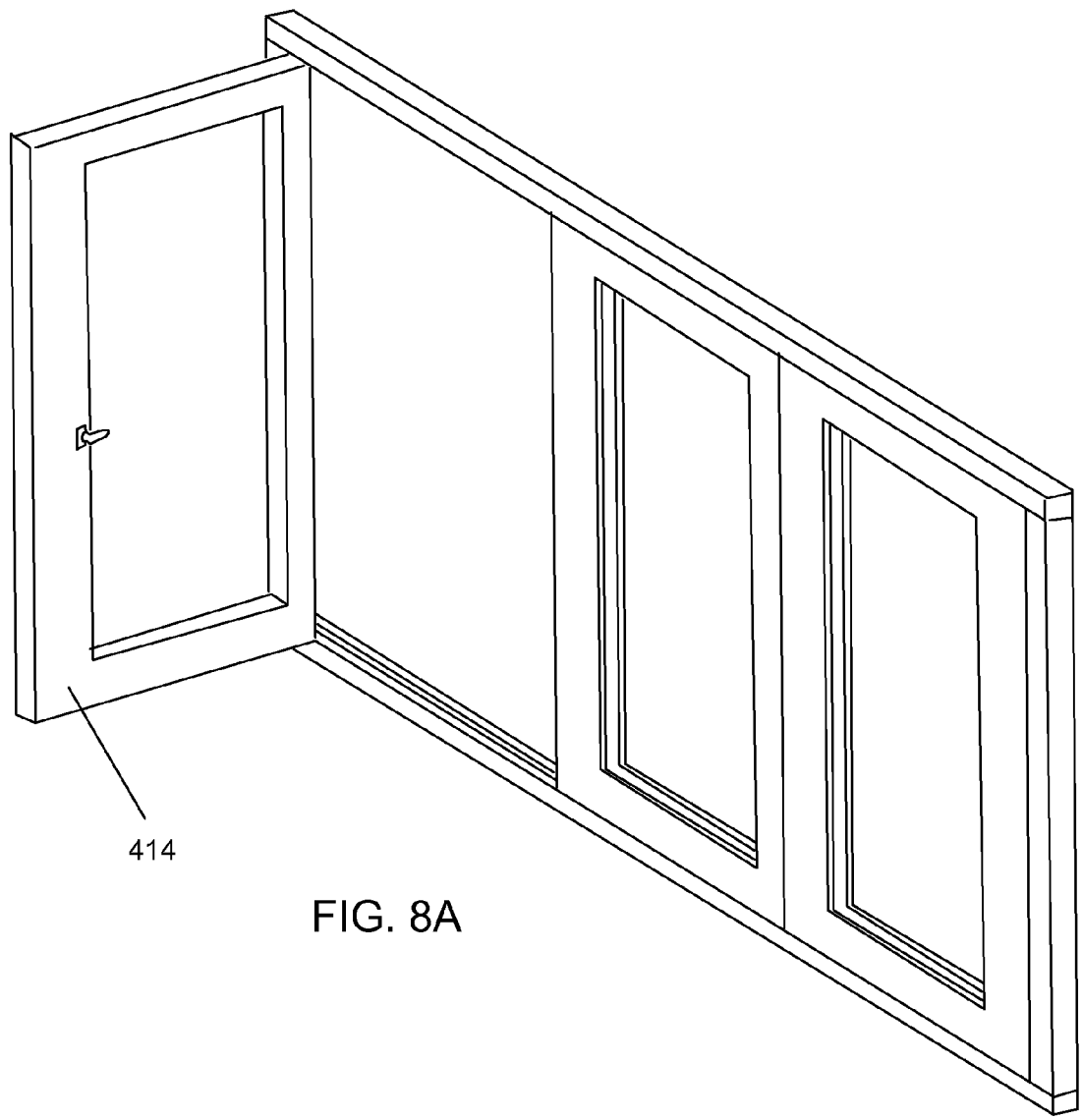
Figure 8B:
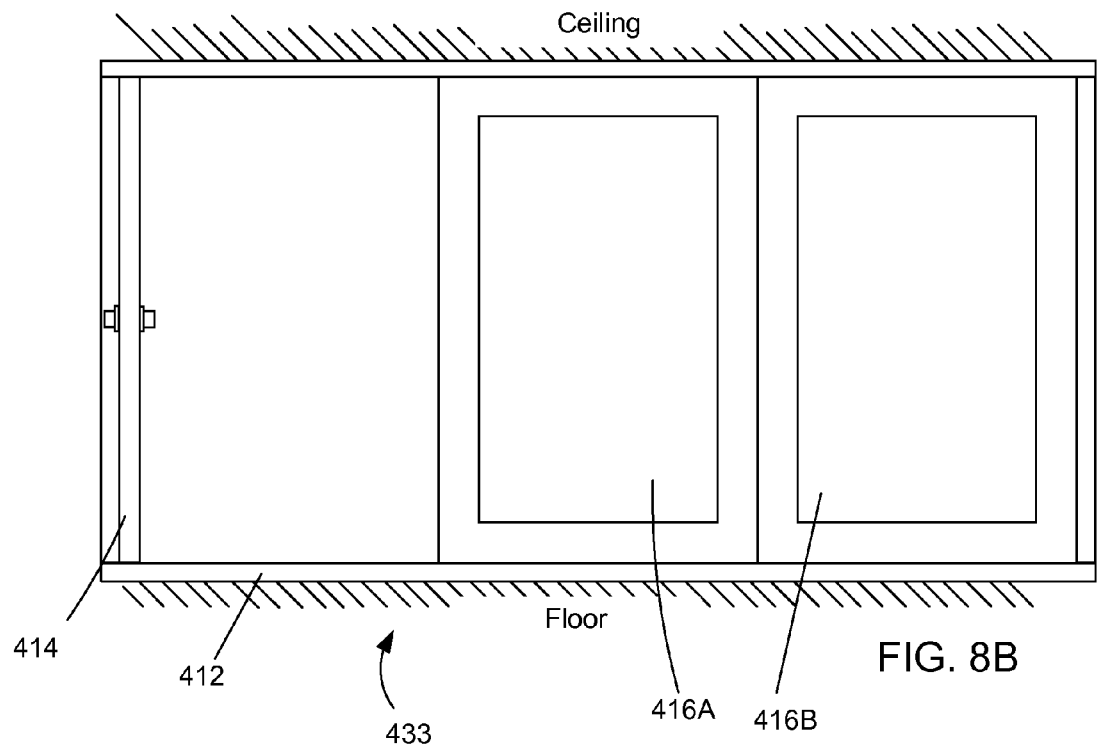
Figure 8C:
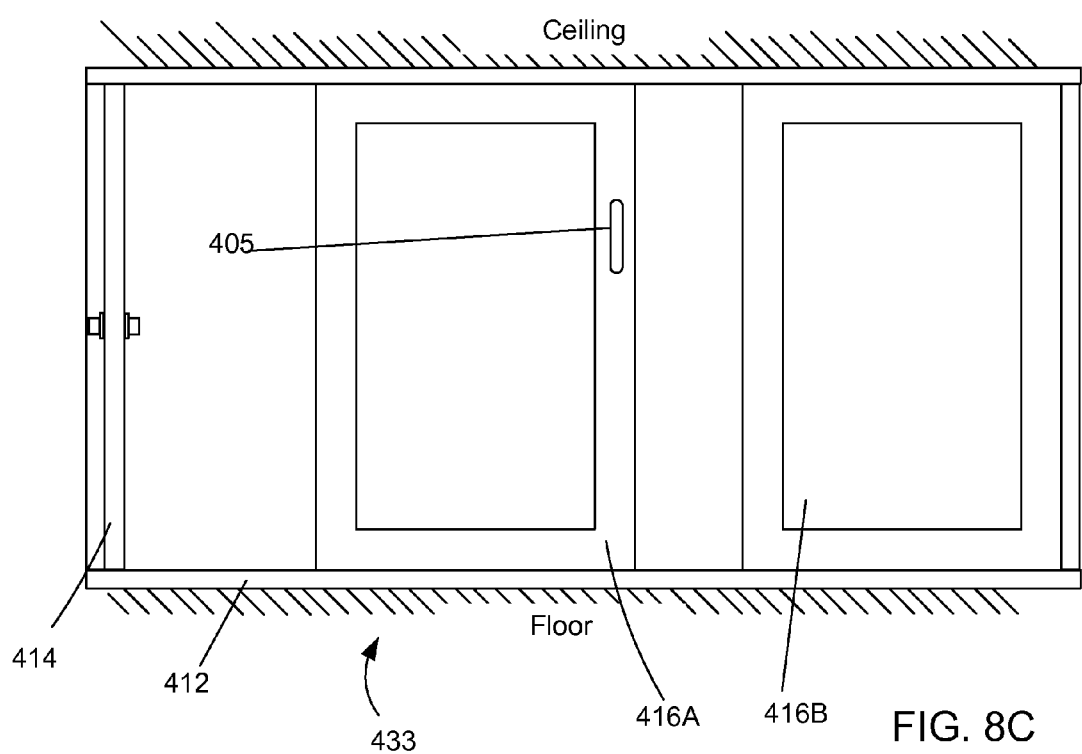

As shown in FIGS. 8A and 8B the user has pulled stationary door 414 so that it has pivoted 90 degrees and is opened. In FIG. 8C the user has grabbed handle 405 and has pulled sliding door 416A to the left. It should be noted that handle 405 is also useful in providing the user with sufficient leverage to overcome the magnetic attraction between magnets 512 and 518 (FIG. 8F) when sliding the doors apart.

Figure 8D:
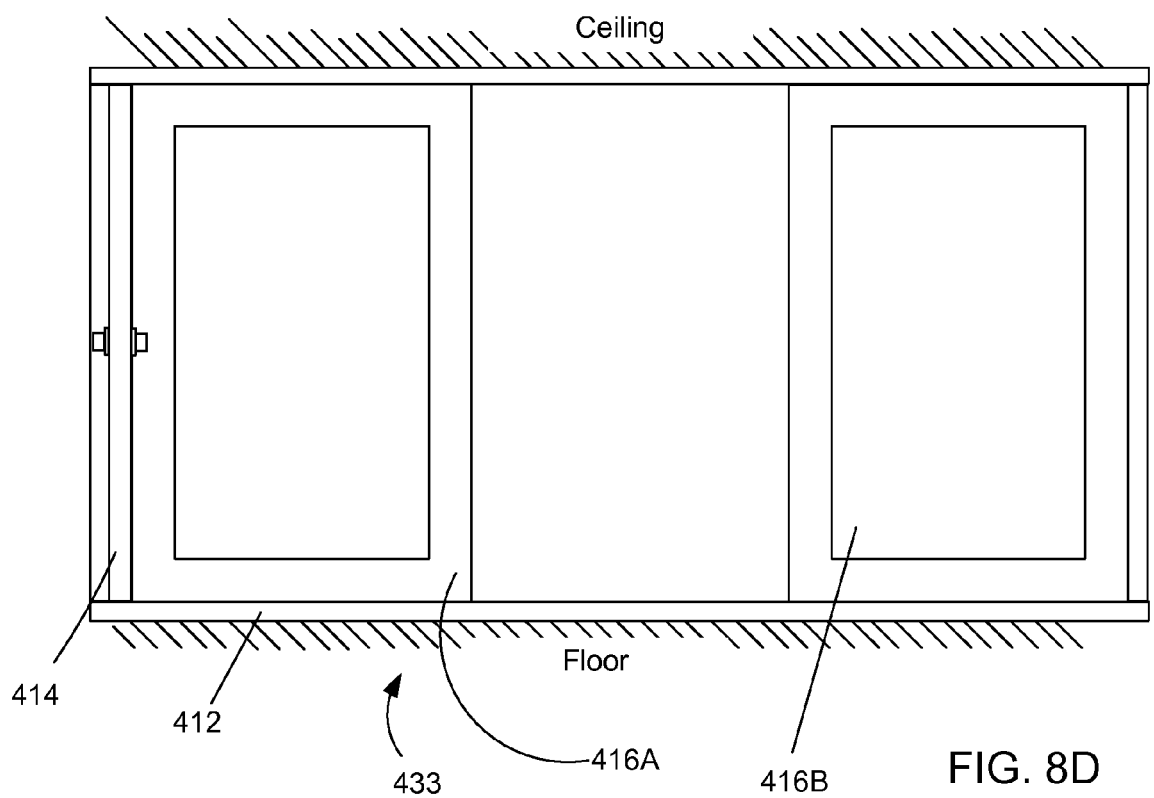
Figure 8E:
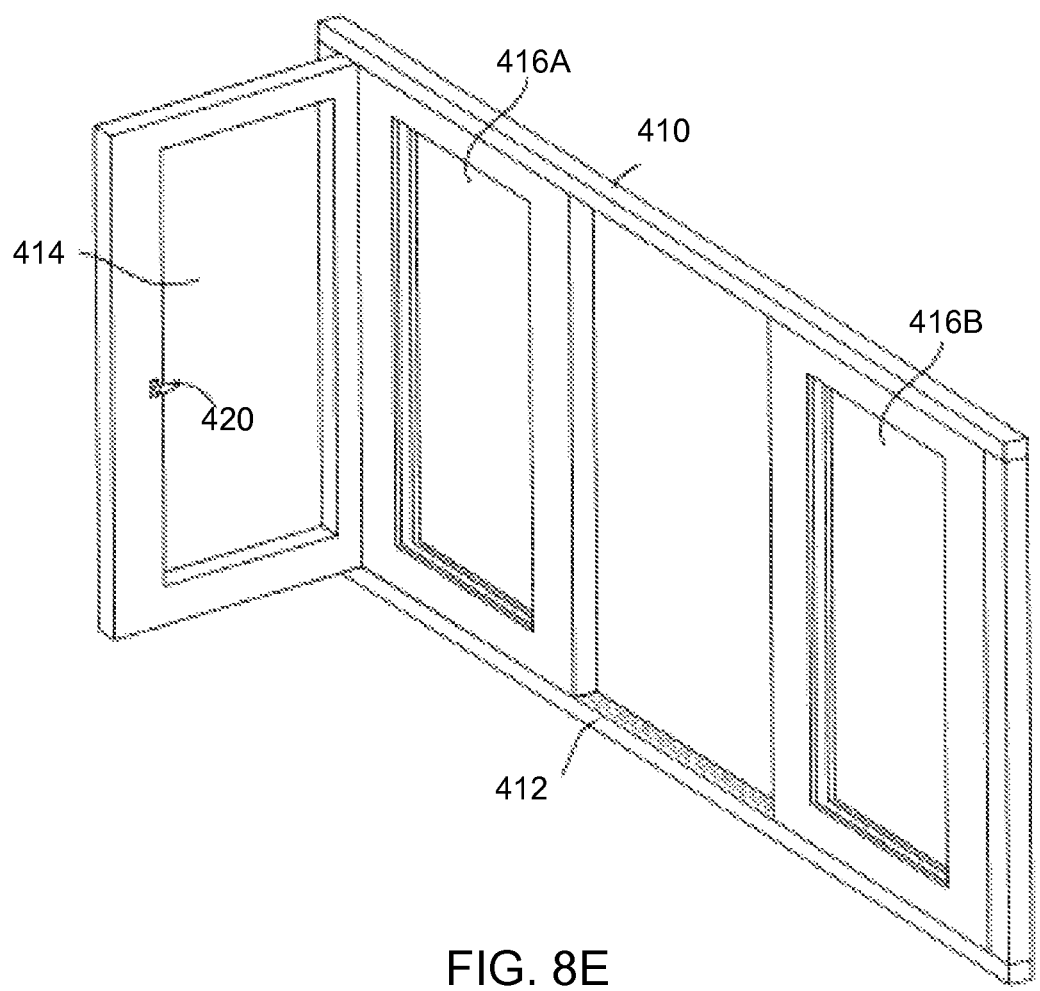
Figure 8F:
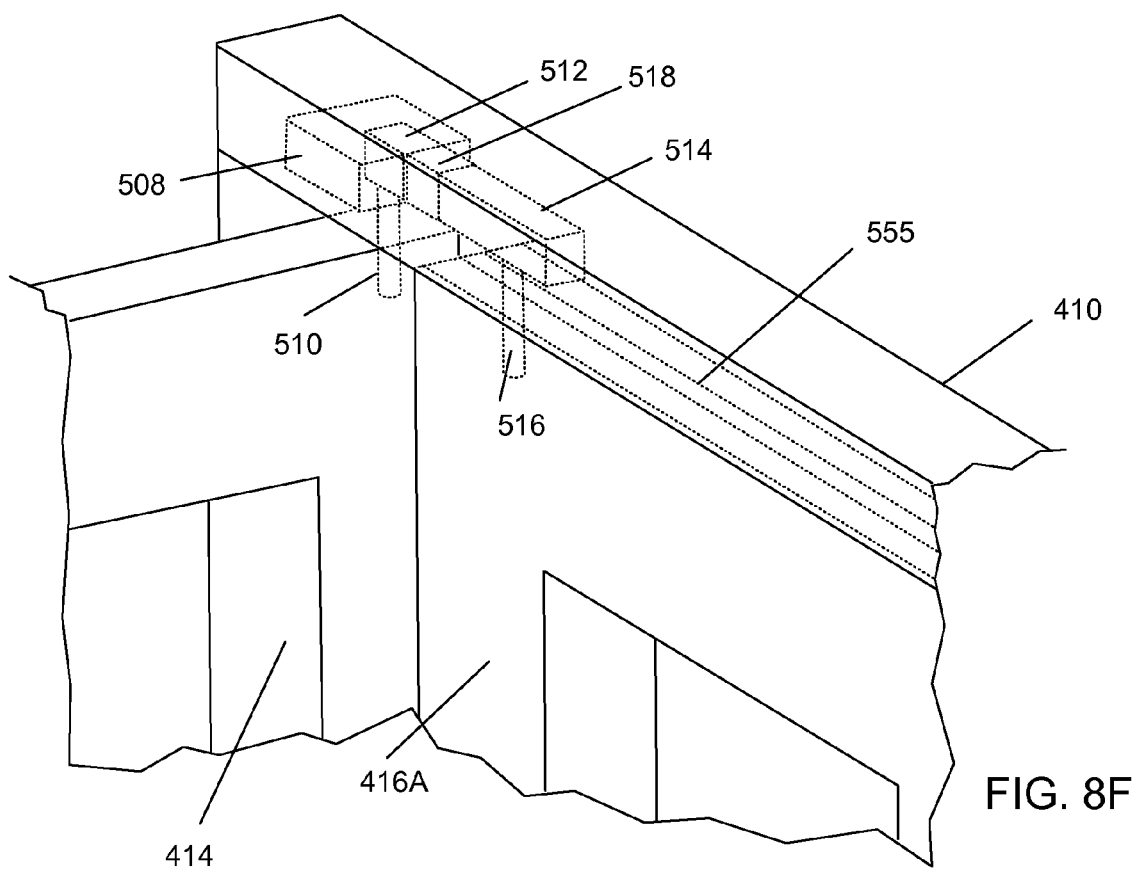

As shown in FIGS. 8D, 8E and 8F the user has pulled sliding door 416A all the way leftward. FIG. 8F shows a close up perspective view of the tops of stationary door 414, sliding door 416A and upper support track 410.

As shown in FIG. 8F, upper pivot hinge 510 extends downward from stationary upper anchor 508. Stationary door magnet 512 is housed inside stationary upper anchor 508. Likewise, upper pivot hinge 516 extends downward from upper magnet holder 514 through slot 555. Sliding door magnet 518 is attached to upper magnet holder 514.

As shown in FIG. 8F stationary door 414 is pivoted 90 degrees open and sliding door 416A has been slid toward stationary door 114 so as to engage stationary door magnet 512 with sliding door magnet 518. Preferably magnets of an industrial strength and quality are utilized.

FIG. 8F shows upper support track 410 having the approximate shape of an upside down "u" with flanges pointing inward toward the center and groove 555 running down the middle so that upper magnet holder 514 can run horizontally within upper support track 410. Stationary door 414 is attached to stationary upper anchor 508 via fixed pivot hinge 510. Preferably, stationary upper anchor 508 is preferably fabricated from aluminum.

Figure 8G:
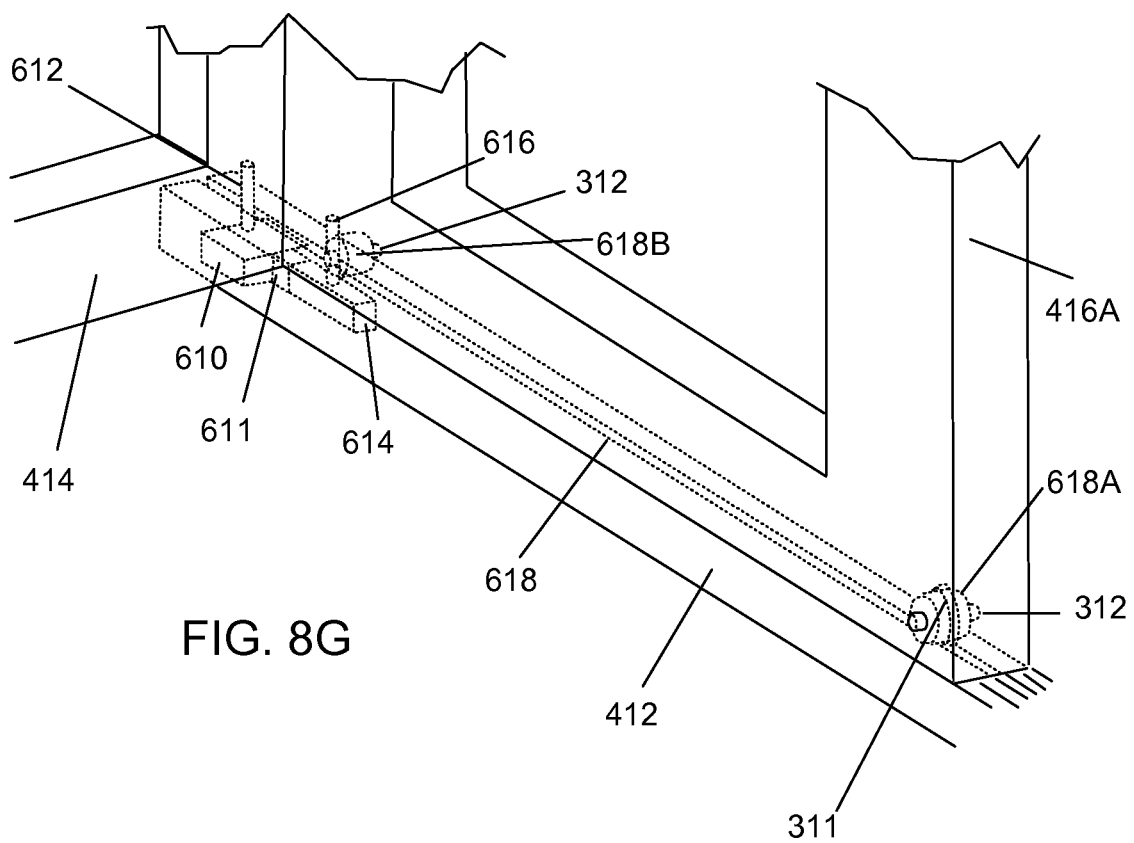

FIG. 8G shows a close up perspective view of the bottom of stationary door 414, sliding door 416A and lower guide rail 412. As shown in FIG. 8G, lower pivot hinge 612 extends upward from bottom stationary anchor 610. Likewise, lower pivot hinge 616 extends upward from lower fulcrum contact piece 614. Lower fulcrum contact piece 614 is slidable within slot 618.

Lower guide rail 412 has a cross section that is fabricated in the general shape of a "u" with flanges pointing inward toward the center and groove 618 running down the middle so lower pivot hinge 616 can run horizontally within the lower guide rail 412.

Rollers 618A and 618B are attached to sliding door 116A via axes 312. Roller 618A includes center extension 311 that fits into groove 618 of lower guide rail 412. Rollers 618A and 618B are wider than the groove 618 and both ride on the top of lower guide rail 412. Preferably, rollers 618A and 618B are made from a heavy duty convex nylon. Rollers 618A and 618B are attached to sliding door 416A in such a way as to enable sliding door 416A to be slid horizontally left or right while keeping sliding door 416A square in the closure. Center extension 311 holds sliding door 416A parallel to upper support track 410 and lower guide rail 412 while sliding door 416A is being slid leftward or rightward.

Fulcrum

Figure 8H:
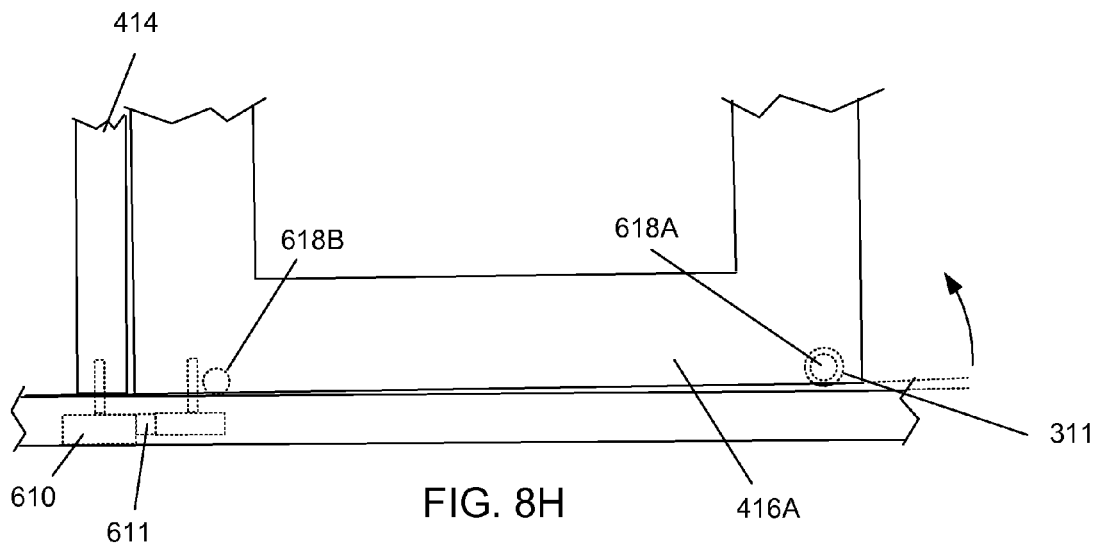

As shown in FIGS. 8G and 8H, fulcrum 611 is rigidly connected to stationary bottom anchor 610 so as to stop lower fulcrum contact piece 614 just before stationary door magnet 512 and sliding door magnet 518 (FIG. 8F) are drawn together via magnetic force. Fulcrum 611 is installed in such a way as to work in unison with stationary door magnet 512 and sliding door magnet 518 and lower fulcrum contact piece 614 to tilt sliding door 416A so as to lift center extension 311 clear of groove 618 of lower guide track 412 (see also FIG. 8H).

Figure 8I:
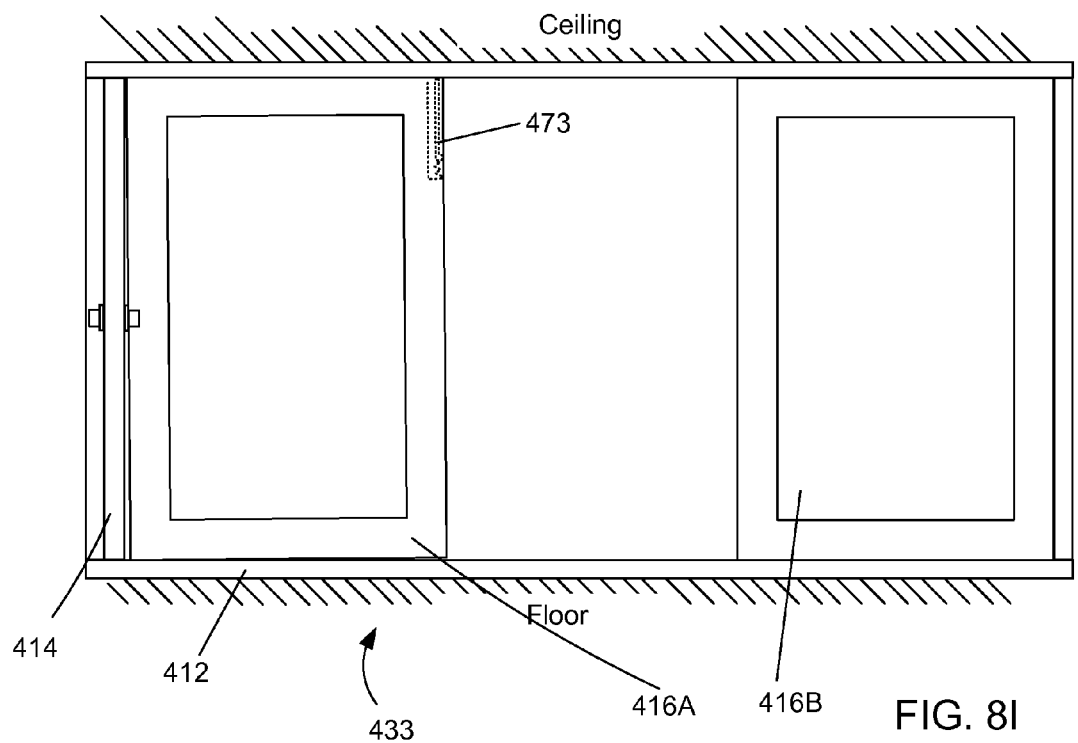

In FIG. 8I, the user has pulled downward on spring loaded door latch 473. This clears latch 473 from slot 555 (FIG. 8F) and allows the user to swing door 416A open.

Figure 9A:
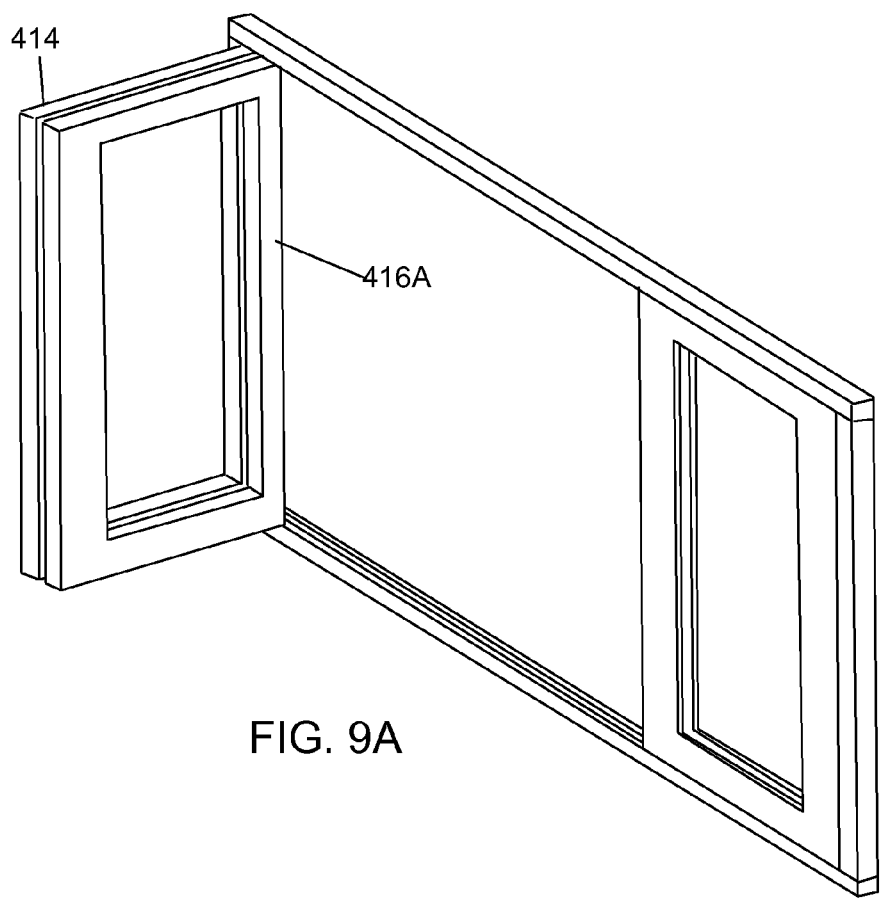
Figure 9B:
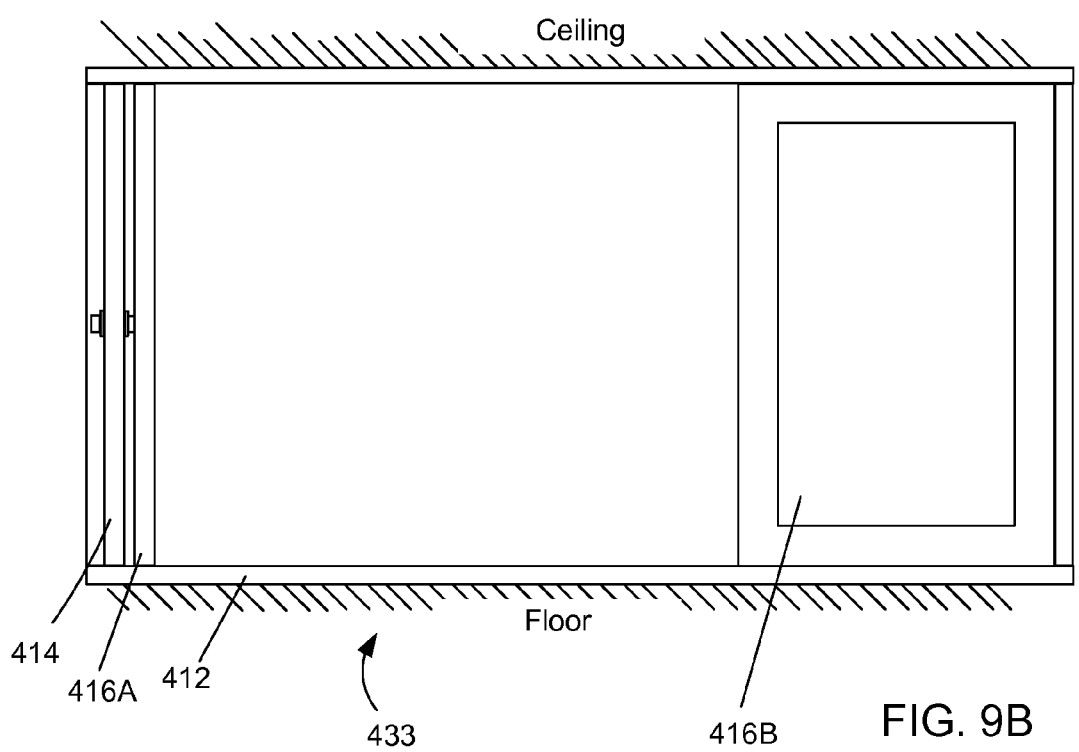

As shown in FIGS. 9A and 9B, because extension 311 is clear of groove 618 (FIGS. 8G and 8H) and latch 473 is clear from slot 555, the user is able to pull on sliding door 416A causing it to pivot about the axis formed by upper pivot hinge 516 (FIG. 8F) and lower pivot hinge 616 (FIG. 8G).

Figure 9C:
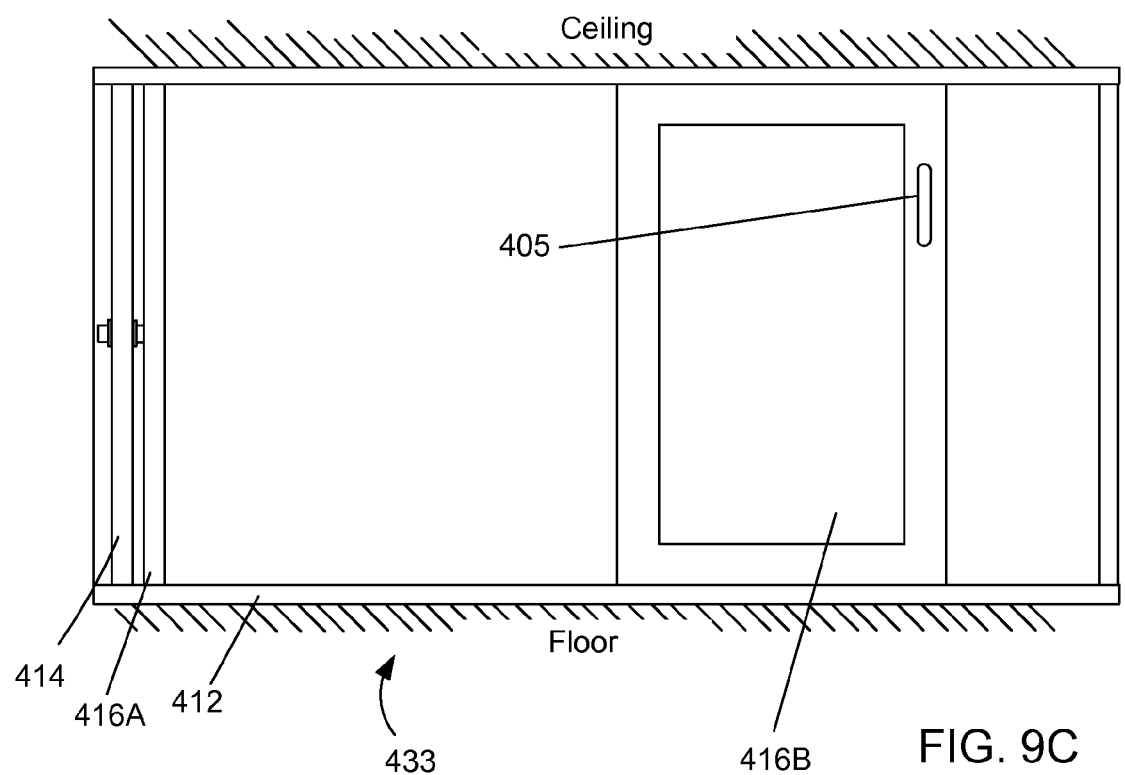

In FIG. 9C the user has grabbed handle 405 of sliding door 416B and has pulled door 405 to the left.

Figure 9D:
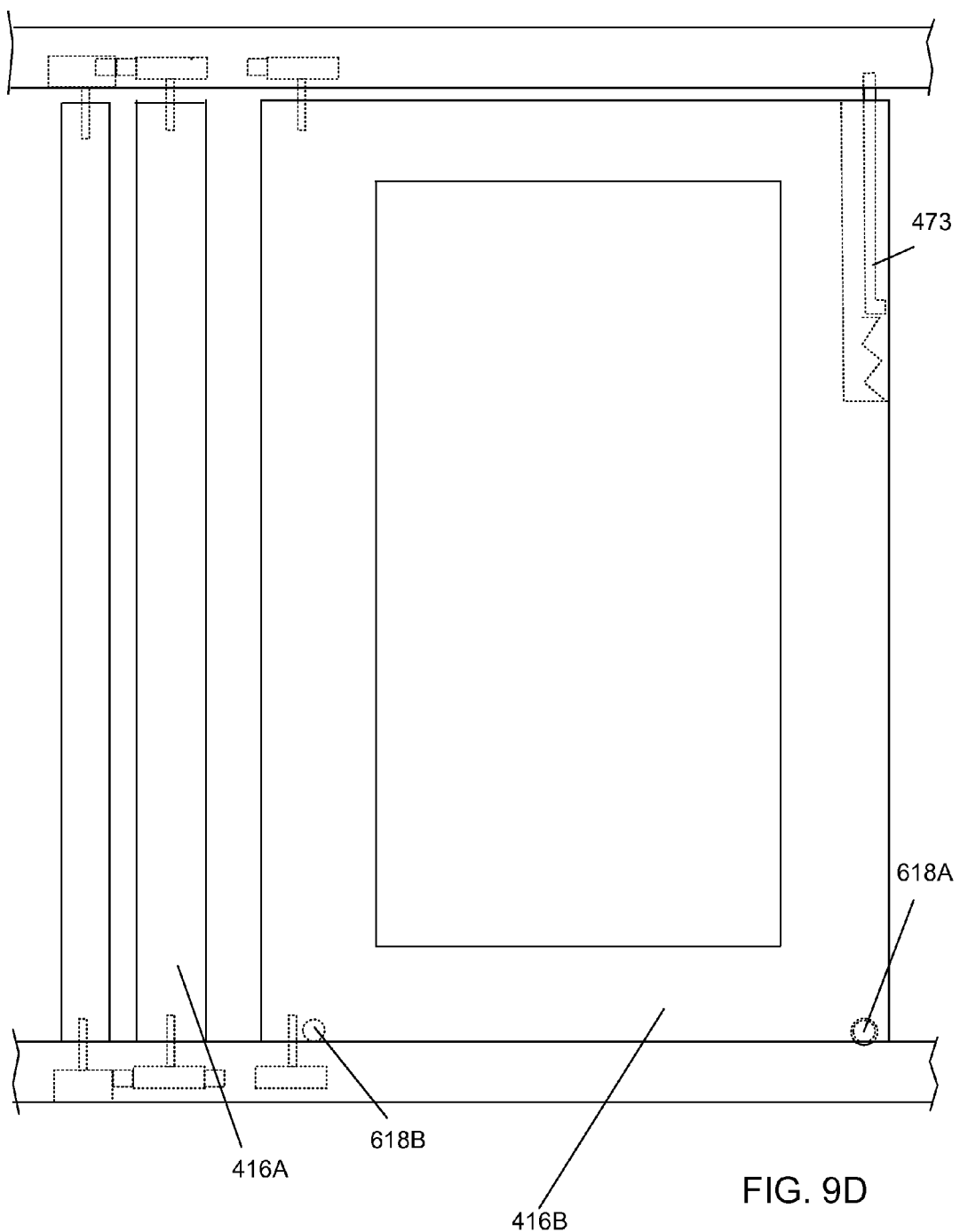

In FIG. 9D, the user has pulled sliding door 416B so that it is very close to opened sliding door 416A. Extension 311 is inside groove 618 (FIG. 8G) of lower guide track 412. Latch 473 is riding in slot 555.

Figure 9E:
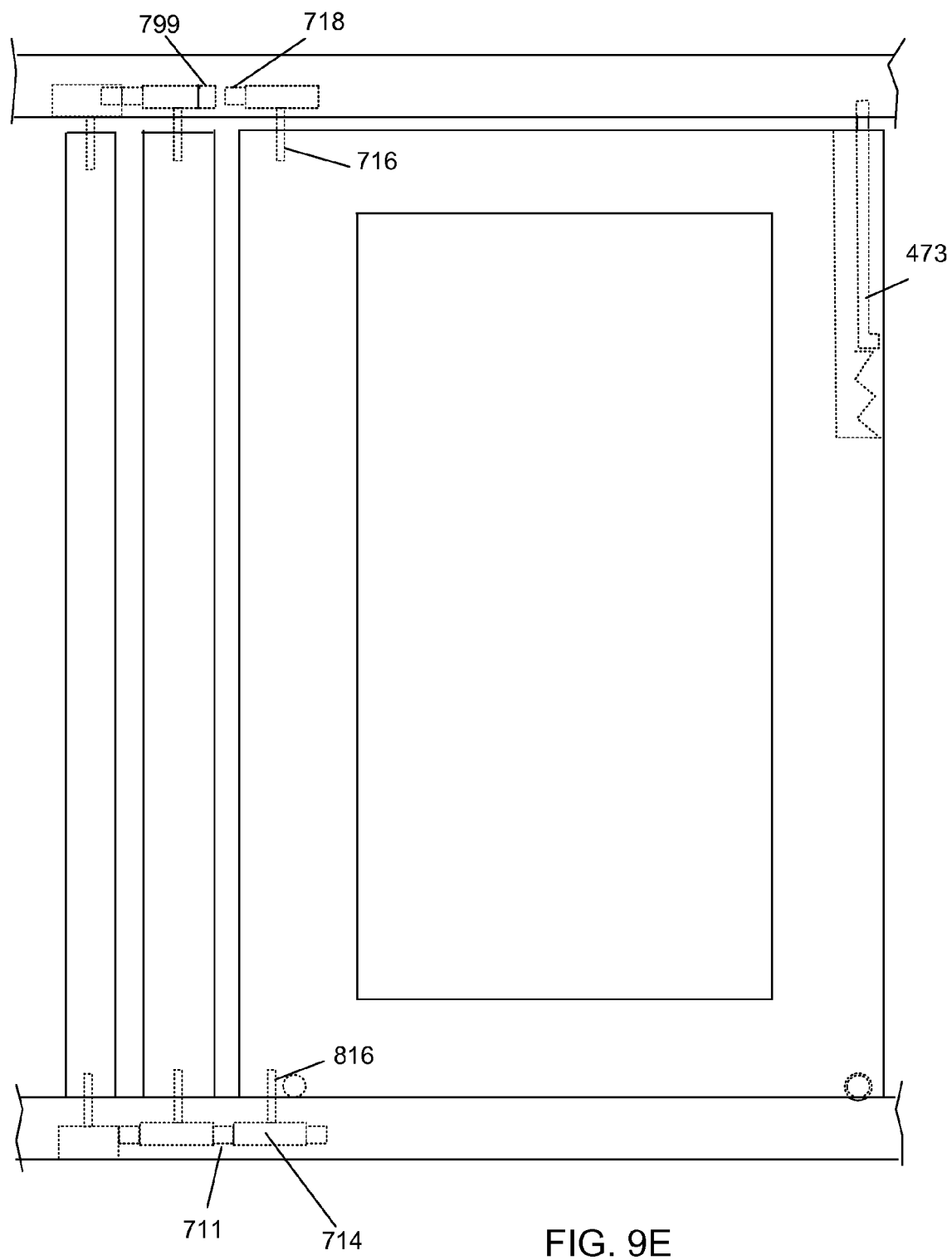

In FIG. 9E, lower fulcrum contact piece 714 has made contact with fulcrum 711. Inside upper support track 410 magnet 718 has not made contact with magnet 799. However, the magnets are of sufficient strength and distance so that a magnetic force is drawing them together.

Figure 9F:
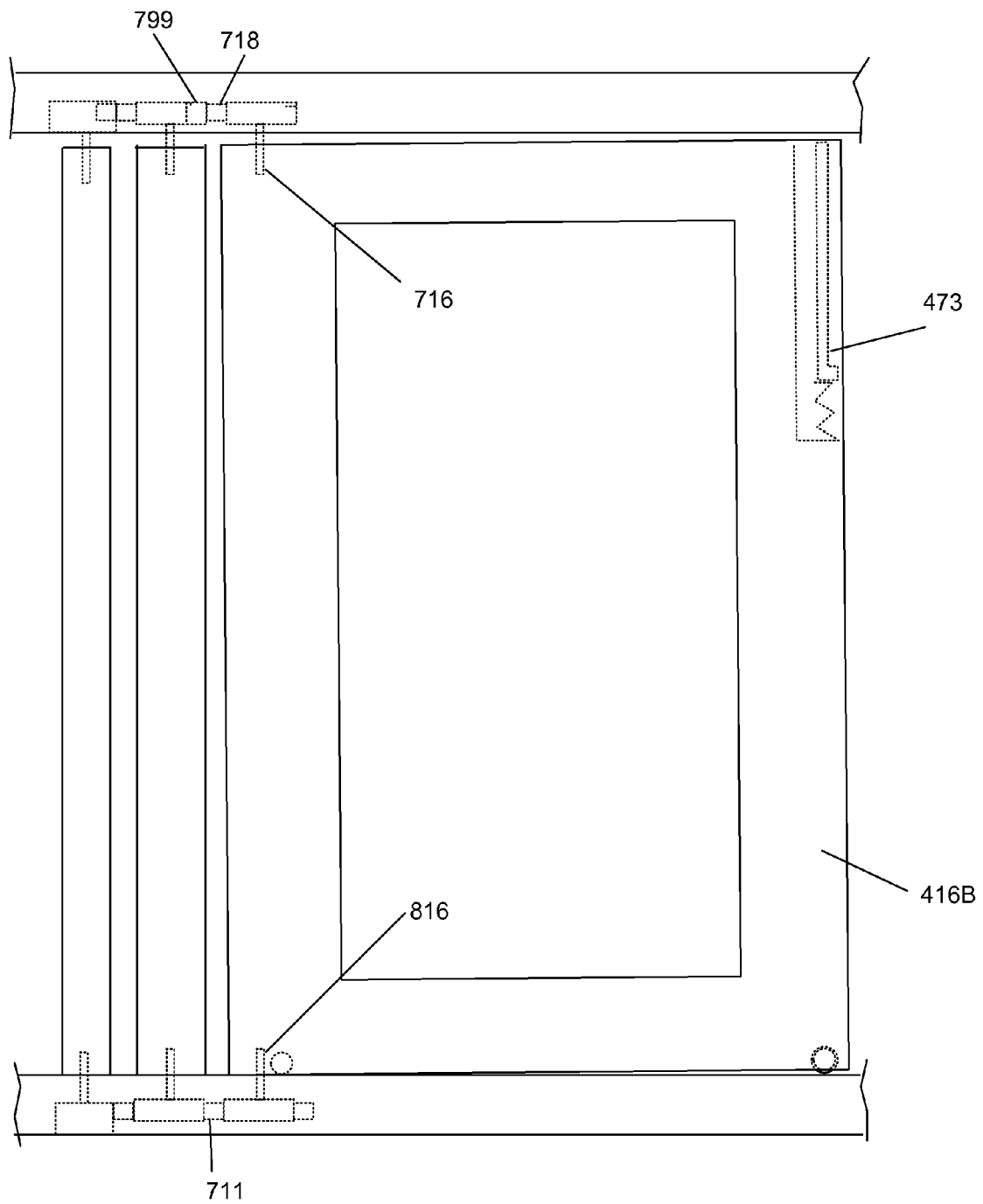

In FIG. 9F, magnetic force has drawn magnet 718 and magnet 799 together. Fulcrum 711 has caused sliding door 416B to pivot as shown so that extension 311 has cleared groove 618 (FIG. 8G) of lower track guide 412. The user has pulled downward on spring loaded door latch 473. This clears latch 473 from slot 555 (FIG. 8F). Now the user may easily open sliding door 416B so that it can pivot about the axis formed by upper pivot hinge 716 and lower pivot hinge 816, as shown in FIGS. 9G and 9H.

Tongue and Groove Door Connection

Figure 9G:
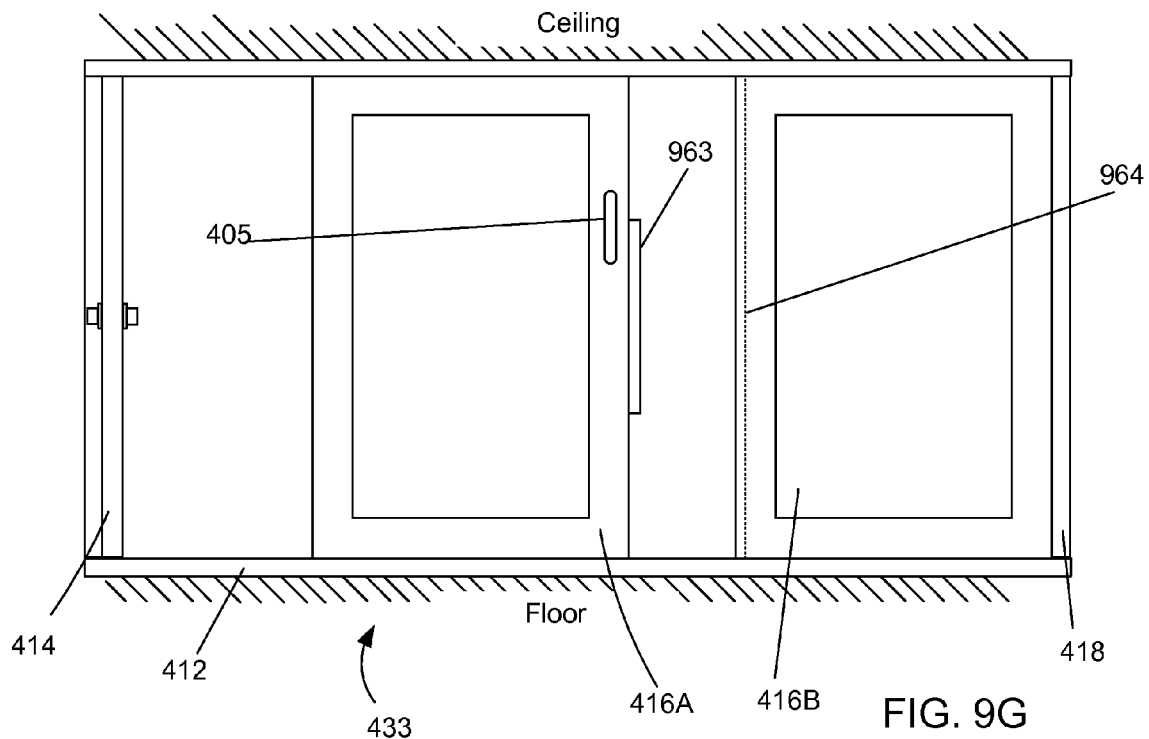
Figure 9H:
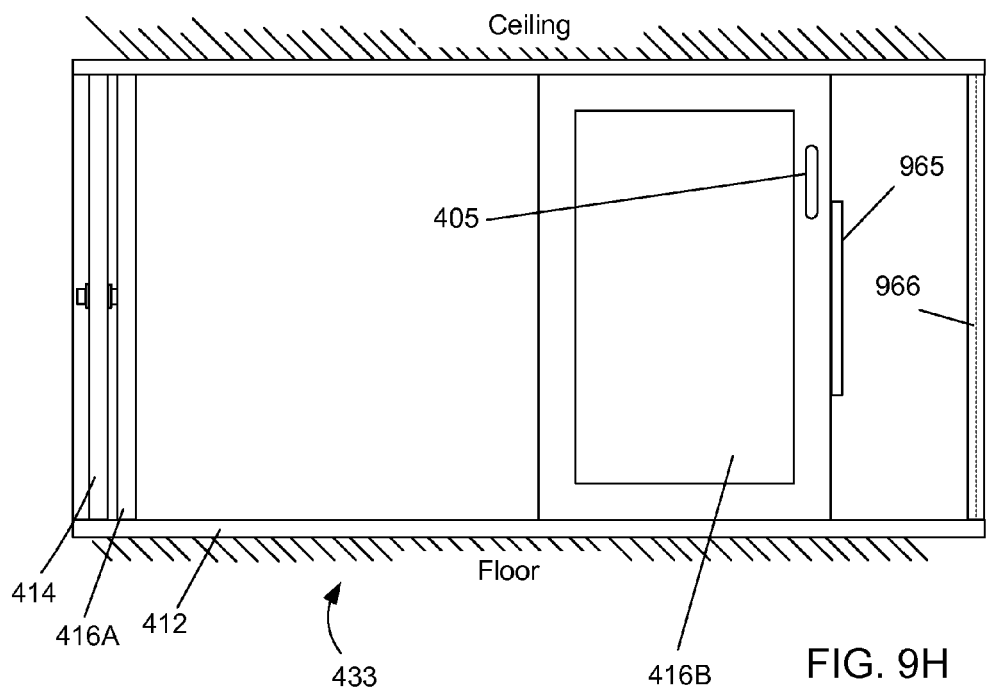

FIG. 9G shows another preferred embodiment of the present invention. In FIG. 9G, there is a press-fit tongue and groove connection between doors 416A and 416B and also between door 416B and door jam 418. As shown in FIG. 9G, tongue 963 is press-fit into groove 964. In FIG. 9H, tongue 965 press-fits into groove 966. For example, to slide doors 416A and 416B horizontally the user will grab handle 405s to overcome the friction force between the tongue and groove connections. The friction force is preferably greater between door 416B and door jam 418, than it is between doors 416A and 416B.

Although the above-preferred embodiments have been described with specificity, persons skilled in this art will recognize that many changes to the specific embodiments disclosed above could be made without departing from the spirit of the invention. For example, although the above preferred embodiments specifically disclose the utilization of magnetic force to attract the upper bogie to the upper anchor, it should be understood that a variety of other mutual attraction devices could also be utilized. For example, some of these include a rotating cam, a plethora of gears, a winged apparatus, a hook and latching pin, and a hollow cam and a solid cam that pivot and interlock. Also, although the above described preferred embodiments disclosed extension 11 attached to roller 318, it is possible to utilize other extension types. For example any extension shape will work so long as it is able to clear grove 13 when the sliding door is tilted by the fulcrum. Also, although it was shown that upper bogie 214 and lower bogie 314 utilized wheels 9 for rolling, it is possible to omit the wheels and utilize bogies that slide within the upper support track and lower guide rail. Therefore, the attached claims and their legal equivalents should determine the scope of the invention.

What is claimed is:

1. A sliding panel structure, comprising:
   A. a sliding panel structure frame, comprising:
      1) an upper support track, and
      2) a lower guide rail,
   B. at least one sliding panel connected between said upper support track and said lower guide rail, said at least one sliding panel comprising:
      1) a sliding panel pivot axis, and
      2) an extension for riding in said lower guide rail to prevent undesired pivoting of said at least one sliding panel about said sliding panel pivot axis,
   C. a mutual attraction device, comprising:
      1) a first mutual attraction part connected to said frame,
      2) a second mutual attraction part connected to said at least one sliding panel,
   D. a fulcrum for tilting said at least one sliding panel whenever said first mutual attraction part engages said second mutual attraction part, said tilting of said at least one sliding panel allowing for said extension to disengage said lower guide rail to allow said at least one sliding panel to pivot about said sliding panel pivot axis.

2. The sliding panel structure as in claim 1, wherein said at least one sliding panel is at least one sliding door.

3. The sliding panel structure as in claim 1, wherein said at least one sliding panel is at least one sliding window.

4. The sliding panel structure as in claim 1, further comprising at least one non-sliding panel pivotally connected between said upper support track and said lower guide rail.

5. The sliding panel structure as in claim 4, further comprising:
   A. an upper stationary anchor rigidly connected to said upper guide track, and
   B. a lower stationary anchor rigidly connected to said lower guide rail,
   wherein said at least one non-sliding panel is pivotally connected between said upper stationary anchor and said lower stationary anchor.

6. The sliding panel structure as in claim 5, further comprising a lower fulcrum contact piece that is movable within said lower guide rail, wherein said at least one sliding panel is pivotally attached between said second mutual attraction part and said lower fulcrum contact piece.

7. The sliding panel structure as in claim 6, further comprising a plurality of wheels connected to said at least one sliding panel to allow for movement of said at least one sliding panel, wherein said plurality of wheels rides on said lower guide rail.

8. The sliding panel as in claim 6 wherein said mutual attraction device is a magnetic attraction device comprising:
   A. a first magnet connected to said upper stationary anchor, and
   B. a second magnet connected to said at least one sliding panel,
   wherein said fulcrum is connected to said lower guide rail, wherein said first magnet and said second magnet are drawn together so that said at least one sliding panel pivots about said fulcrum allowing said extension to disengage said lower guide rail to allow said at least one sliding panel to pivot about said pivot axis.

9. The sliding panel as in claim 8, wherein said at least one sliding panel is a plurality of sliding panels wherein each of said plurality of sliding panels comprises a sliding panel pivot axis, wherein each of said plurality of sliding panels utilizes magnetic attractive force and a fulcrum to pivot about each sliding panel pivot axis.

* * * * *